US012574534B2

(12) United States Patent
Hendry

(10) Patent No.: US 12,574,534 B2
(45) Date of Patent: Mar. 10, 2026

(54) TRANSMISSION DEVICE FOR POINT CLOUD DATA AND METHOD PERFORMED BY TRANSMISSION DEVICE, AND RECEPTION DEVICE FOR POINT CLOUD DATA AND METHOD PERFORMED BY RECEPTION DEVICE

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/716,035

(22) PCT Filed: Dec. 13, 2022

(86) PCT No.: PCT/KR2022/020191
§ 371 (c)(1),
(2) Date: Jun. 3, 2024

(87) PCT Pub. No.: WO2023/113417
PCT Pub. Date: Jun. 22, 2023

(65) Prior Publication Data
US 2024/0357139 A1 Oct. 24, 2024

Related U.S. Application Data

(60) Provisional application No. 63/289,615, filed on Dec. 14, 2021.

(51) Int. Cl.
*H04N 19/31* (2014.01)
*G06T 17/00* (2006.01)
*H04N 19/597* (2014.01)

(52) U.S. Cl.
CPC ............. *H04N 19/31* (2014.11); *G06T 17/00* (2013.01); *H04N 19/597* (2014.11)

(58) Field of Classification Search
CPC ...... H04N 19/31; H04N 19/597; H04N 19/70; H04N 21/2343; H04N 21/434;
(Continued)

(56) References Cited

U.S. PATENT DOCUMENTS

| | | | |
|---|---|---|---|
| 2020/0045323 A1 | 2/2020 | Hannuksela et al. | |
| 2021/0360268 A1 | 11/2021 | Drugeon et al. | |
| 2023/0281923 A1* | 9/2023 | Gudumasu ........... | H04N 19/597 |
| | | | 345/419 |

FOREIGN PATENT DOCUMENTS

| | | |
|---|---|---|
| KR | 10-2021-0004885 A | 1/2021 |
| KR | 10-2021-0005524 A | 1/2021 |
| WO | 2021/123159 A1 | 6/2021 |

OTHER PUBLICATIONS

ISO/IEC JTC 1/SC 29/WG 03 MPEG Systems (WD of ISO/IEC 23090-18 AMD 1 Support of Temporal Scalability, N0423, Oct. 2021 (Year: 2021).*

(Continued)

*Primary Examiner* — Maria E Vazquez Colon
(74) *Attorney, Agent, or Firm* — Bryan Cave Leighton Paisner LLP

(57) ABSTRACT

A transmission device of point cloud data, a method performed by the transmission device, a reception device and a method performed by the reception device are provided. A method performed by a reception device of point cloud data comprises acquiring temporal scalability information of a point cloud in a three-dimensional space based on a G-PCC file and reconstructing the three-dimensional point cloud based on the temporal scalability information. The temporal scalability information may be acquired from one or more tracks, and temporal scalability information of a first track (Continued)

may be derived from temporal scalability information of a second track based on a component carried by the first track.

10 Claims, 12 Drawing Sheets

(58) Field of Classification Search
CPC ............. H04N 21/4402; H04N 21/816; H04N 21/85406; H04N 21/236; G06T 17/00
See application file for complete search history.

(56) References Cited

OTHER PUBLICATIONS

Sijin Ho et al. (2021), "Draft Text of ISO/IEC FDIS 23090-18 Carriage of Geometry-Based Point Cloud Compression Data," ISO/IEC JTC 1/SC 29/WG03 NO311, MPEG Systems, Convenorship: KATS (Korea, Repbulic of), Oct. 2021, Virtual, 78 pages.
WG 03, MPEG Systems (2021), "WD of ISO/IEC 23090-18 AMD 1 Support of Temporal Scalability," ISO/IEC JTC 1/SC 29/WG03 NO423, MPEG Systems, Convenorship: KATS (Korea, Repbulic of), Oct. 2021, Virtual, 11 pages.
Srinivas Gudumasu et al.(2021), "On Temporal Scalability Support in ISO/IEC 23090-18," ISO/IEC JTC 1/SC 29/WG 3 M56661, Apr. 2021, Electronic Meeting, 6 pages.
Srinivas Gudumasu et al.(2022), "On Temporal Scalability Support in ISO/IEC 23090-18," ISO/IEC JTC 1/SC 29/WG 3 M58436, Jan. 2022, Electronic Meeting, 6 pages.

* cited by examiner

FIG. 4
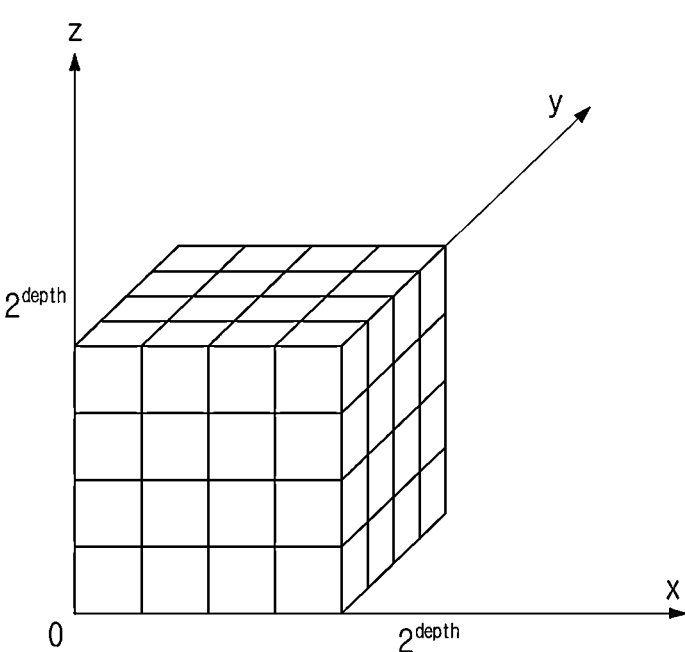
FIG. 5
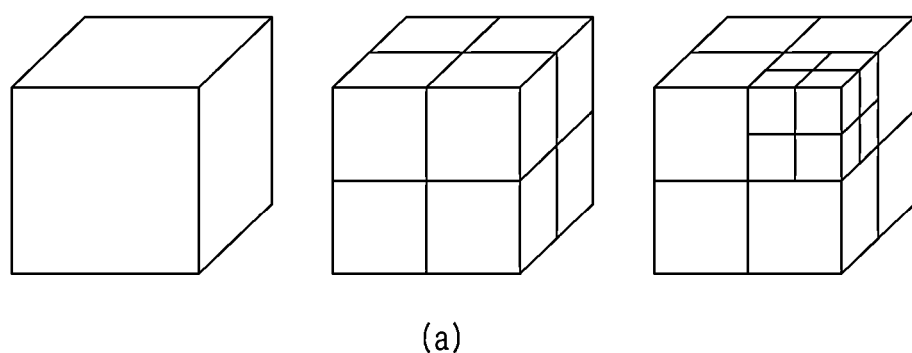
(a)
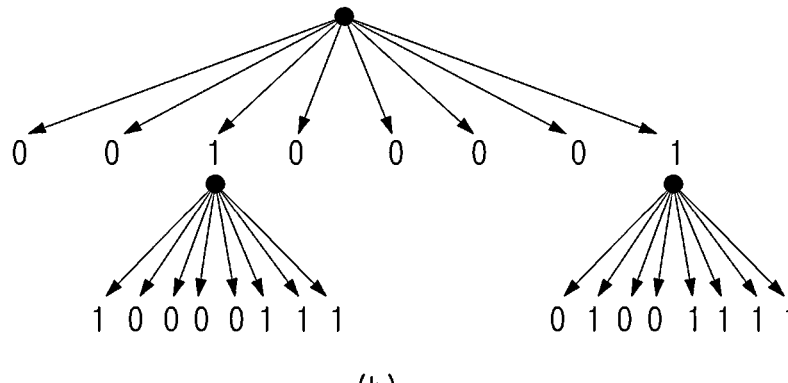
(b)

FIG. 8

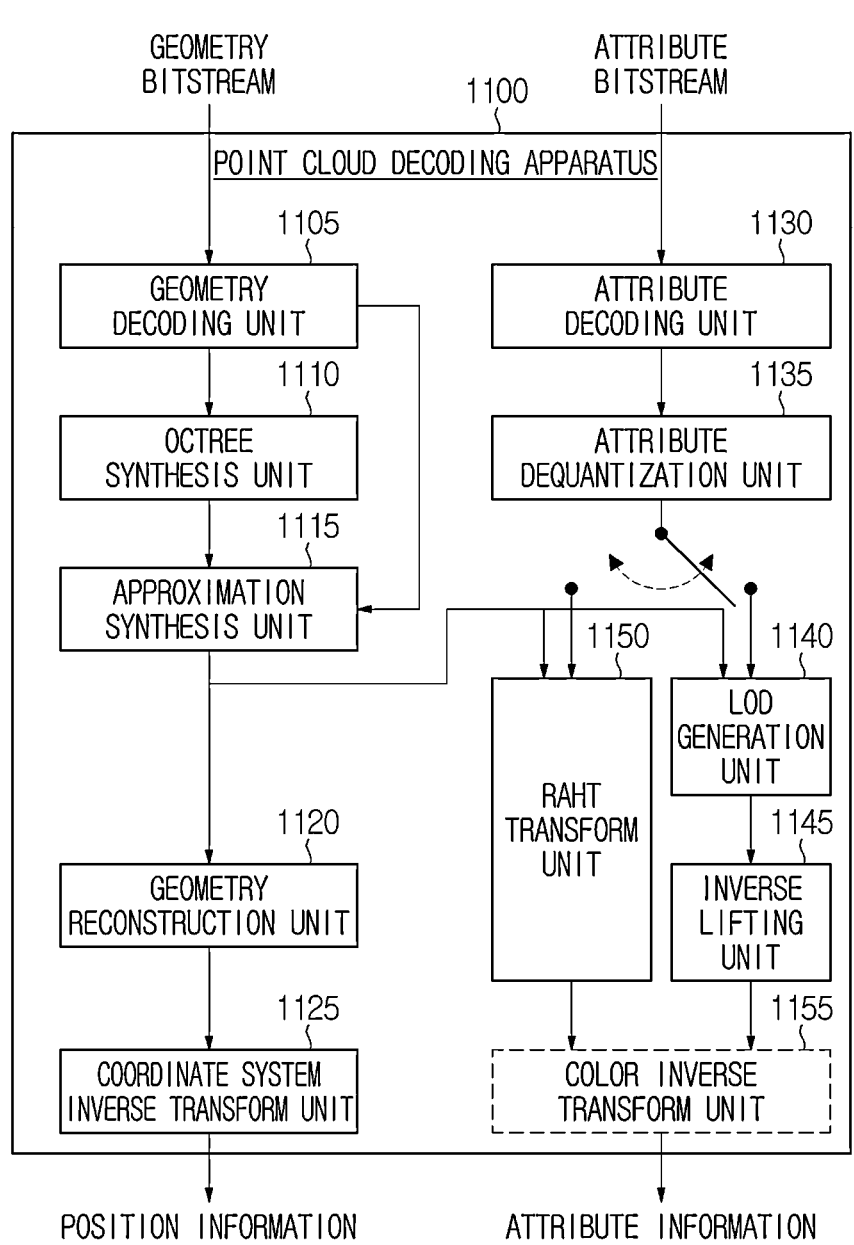

POINT CLOUD DECODING APPARATUS 1100

GEOMETRY BITSTREAM

ATTRIBUTE BITSTREAM

1105 GEOMETRY DECODING UNIT

1130 ATTRIBUTE DECODING UNIT

1110 OCTREE SYNTHESIS UNIT

1135 ATTRIBUTE DEQUANTIZATION UNIT

1115 APPROXIMATION SYNTHESIS UNIT

1150 RAHT TRANSFORM UNIT

1140 LOD GENERATION UNIT

1120 GEOMETRY RECONSTRUCTION UNIT

1145 INVERSE LIFTING UNIT

1125 COORDINATE SYSTEM INVERSE TRANSFORM UNIT

1155 COLOR INVERSE TRANSFORM UNIT

POSITION INFORMATION

ATTRIBUTE INFORMATION (a)

| Sample | | |
|---|---|---|
| Parameter Set TLV (if, present) | Geometry TLV | $Attribute_0$ TLV (if, present) |

(b)

(a)

(b)

TRANSMISSION DEVICE FOR POINT CLOUD DATA AND METHOD PERFORMED BY TRANSMISSION DEVICE, AND RECEPTION DEVICE FOR POINT CLOUD DATA AND METHOD PERFORMED BY RECEPTION DEVICE

CROSS-REFERENCE TO RELATED APPLICATIONS

This application is a National Stage application under 35 U.S.C. § 371 of International Application No. PCT/KR2022/020191, filed on Dec. 13, 2022, which claims the benefit of and priority to U.S. Provisional Application No. 63/289,615, filed on Dec. 14, 2021. The disclosures of the prior applications are incorporated by reference in their entirety.

TECHNICAL FIELD

The present disclosure relates to a method and device for processing point cloud content.

BACKGROUND ART

Point cloud content is expressed as a point cloud which is a set of points belonging to a coordinate system representing a three-dimensional space. The point cloud content may represent three-dimensional media and is used to provide various services such as virtual reality (VR), augmented reality (AR), mixed reality (MR) and self-driving services. Since tens of thousands to hundreds of thousands of point data are required to express point cloud content, a method of efficiently processing a vast amount of point data is required.

DISCLOSURE

Technical Problem

The present disclosure provides a device and method for efficiently processing point cloud data. The present disclosure provides a point cloud data processing method and device for solving latency and encoding/decoding complexity.

In addition, the present disclosure provides a device and methods for supporting temporal scalability in the carriage of geometry-based point cloud compressed data (G-PCC).

In addition, the present disclosure proposes a device and methods for efficiently storing a G-PCC bitstream in a single track in a file or divisionally storing it in a plurality of tracks and providing a point cloud content service providing signaling thereof.

In addition, the present disclosure proposes a device and methods for processing a file storage technique to support efficient access to a stored G-PCC bitstream.

In addition, the present disclosure proposes a device and method for specifying a track capable of carrying temporal scalability information when temporal scalability is supported.

The technical problems solved by the present disclosure are not limited to the above technical problems and other technical problems which are not described herein will become apparent to those skilled in the art from the following description.

Technical Solution

According to an embodiment of the present disclosure, a method performed by a reception device of point cloud data may comprise acquiring temporal scalability information of a point cloud in a three-dimensional space based on a G-PCC file and reconstructing the three-dimensional point cloud based on the temporal scalability information. The temporal scalability information may be acquired from one or more tracks, and temporal scalability information of a first track may be derived from temporal scalability information of a second track based on a component carried by the first track.

According to an embodiment of the present disclosure, a method performed by a transmission device of point cloud data may comprise determining whether temporal scalability is applied to point cloud data in a three-dimensional space and generating a G-PCC file by including temporal scalability information and the point cloud data. The temporal scalability information may be carried by one or more tracks, and whether temporal scalability information is present in a first track may be determined based on a component carried by the first track.

According to an embodiment of the present disclosure, a reception device of point cloud data may comprise a memory and at least one processor. The at least one processor may acquire temporal scalability information of a point cloud in a three-dimensional space based on a G-PCC file and reconstruct the three-dimensional point cloud based on the temporal scalability information. The temporal scalability information may be acquired from one or more tracks, and temporal scalability information of a first track may be derived from temporal scalability information of a second track based on a component carried by the first track.

According to an embodiment of the present disclosure, a transmission device of point cloud data may comprise a memory and at least one processor. The at least one processor may determine whether temporal scalability is applied to point cloud data in a three-dimensional space and generate a G-PCC file by including temporal scalability information and the point cloud data. The temporal scalability information may be carried by one or more tracks, and whether temporal scalability information is present in a first track may be determined based on a component carried by the first track.

According to an embodiment of the present disclosure, a computer-readable medium storing a G-PCC bitstream or file is disclosed. The G-PCC bitstream or file may be generated by a method performed by a transmission device of point cloud data.

According to an embodiment of the present disclosure, a method of transmitting a G-PCC bitstream or file is disclosed. The G-PCC bitstream or file may be generated by a method performed by a transmission device of point cloud data.

Advantageous Effects

The device and method according to embodiments of the present disclosure may process point cloud data with high efficiency.

The device and method according to embodiments of the present disclosure may provide a high-quality point cloud service.

The device and method according to embodiments of the present disclosure may provide point cloud content for providing universal services such as a VR service and a self-driving service.

The device and method according to embodiments of the present disclosure may provide temporal scalability for effectively accessing a desired component among G-PCC components.

The device and method according to embodiments of the present disclosure may specify a track capable of carrying temporal scalability information when temporal scalability is supported, thereby reducing signaling overhead and improving image encoding/decoding efficiency.

The device and method according to the embodiments of the present disclosure may support temporal scalability, such that data may be manipulated at a high level consistent with a network function or a decoder function, and thus performance of a point cloud content provision system can be improved.

The device and method according to embodiments of the present disclosure may divide a G-PCC bitstream into one or more tracks in a file and store them.

The device and method according to embodiments of the present disclosure may enable smooth and gradual playback by reducing an increase in playback complexity.

DESCRIPTION OF DRAWINGS

FIG. 4 illustrates an example of a voxel according to embodiments of the present disclosure.

FIG. 5 illustrates an example of an octree and occupancy code according to embodiments of the present disclosure.

FIG. 8 is a block diagram illustrating another example of a point cloud decoding apparatus according to embodiments of the present disclosure.

MODE FOR INVENTION

Figure 1:
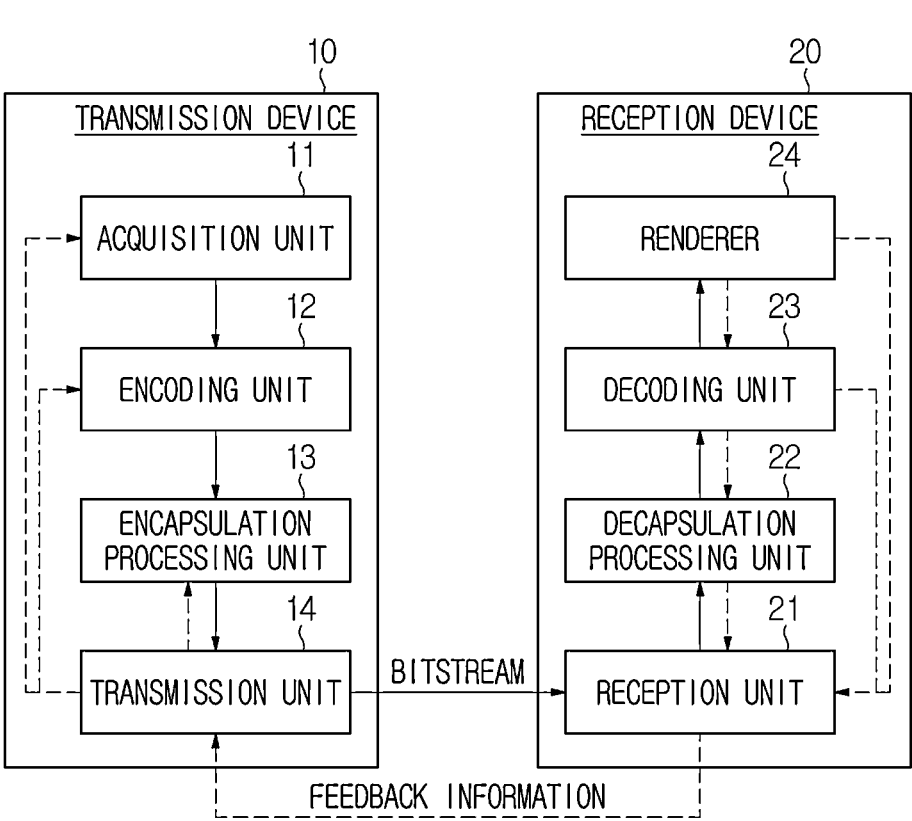
FIG. 1 is a block diagram illustrating an example of a system for providing point cloud content according to embodiments of the present disclosure.

Hereinafter, embodiments of the present disclosure will be described in detail with reference to the accompanying drawings so that those of ordinary skill in the art to which the present disclosure pertains can easily implement them. The present disclosure may be embodied in several different forms and is not limited to the embodiments described herein.

In describing the present disclosure, a detailed description of known functions and configurations will be omitted when it may obscure the subject matter of the present disclosure. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which another component exists in therebetween. In addition, when it is said that a component "includes" or "has" another component, this indicates that the other components are not excluded, but may be further included unless specially described.

In the present disclosure, terms such as first, second, etc. are used only for the purpose of distinguishing one component from other components, and, unless otherwise specified, the order or importance of the components is not limited. Accordingly, within the scope of the present disclosure, a first component in one embodiment may be referred to as a second component in another embodiment, and, similarly, a second component in one embodiment is referred to as a first component in another embodiment.

In the present disclosure, components that are distinguished from each other are for clearly explaining features thereof, and do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some thereof may be optional components. Accordingly, an embodiment composed of a subset of components described in one embodiment is also included in the scope of the present disclosure. In addition, embodiments including other components in addition to components described in various embodiments are also included in the scope of the present disclosure.

The present disclosure relates to encoding and decoding of point cloud-related data, and terms used in the present disclosure may have general meanings commonly used in the technical field to which the present disclosure belongs unless they are newly defined in the present disclosure.

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to compression of point cloud-related data. Various methods or embodiments of the present disclosure may be applied to a point cloud compression or point cloud coding (PCC) standard (e.g., G-PCC or V-PCC standard) of a moving picture experts group (MPEG) or a next-generation video/image coding standard.

In the present disclosure, a "point cloud" may mean a set of points located in a three-dimensional space. Also, in the present disclosure, "point cloud content" is expressed as a point cloud, and may mean a "point cloud video/image". Hereinafter, the 'point cloud video/image' is referred to as a 'point cloud video'. A point cloud video may include one or more frames, and one frame may be a still image or a picture. Accordingly, the point cloud video may include a point cloud image/frame/picture, and may be referred to as any one of a "point cloud image", a "point cloud frame", and a "point cloud picture".

In the present disclosure, "point cloud data" may mean data or information related to each point in the point cloud. Point cloud data may include geometry and/or attribute. In addition, the point cloud data may further include metadata. The point cloud data may be referred to as "point cloud content data" or "point cloud video data" or the like. In addition, the point cloud data may be referred to as "point cloud content", "point cloud video", "G-PCC data", and the like.

In the present disclosure, a point cloud object corresponding to point cloud data may be represented in a box shape based on a coordinate system, and the box shape based on the coordinate system may be referred to as a bounding box. That is, the bounding box may be a rectangular cuboid capable of accommodating all points of the point cloud, and may be a cuboid including a source point cloud frame.

In the present disclosure, geometry includes the position (or position information) of each point, and the position may be expressed by parameters (e.g., for example, an x-axis value, a y-axis value, and a z-axis value) representing a three-dimensional coordinate system (e.g., a coordinate system consisting of an x-axis, y-axis, and z-axis). The geometry may be referred to as "geometry information".

In the present disclosure, the attribute may include properties of each point, and the properties may include one or more of texture information, color (RGB or YCbCr), reflectance (r), transparency, etc. of each point. The attribute may be referred to as "attribute information". Metadata may include various data related to acquisition in an acquisition process to be described later.

Overview of Point Cloud Content Provision System

Figure 2:
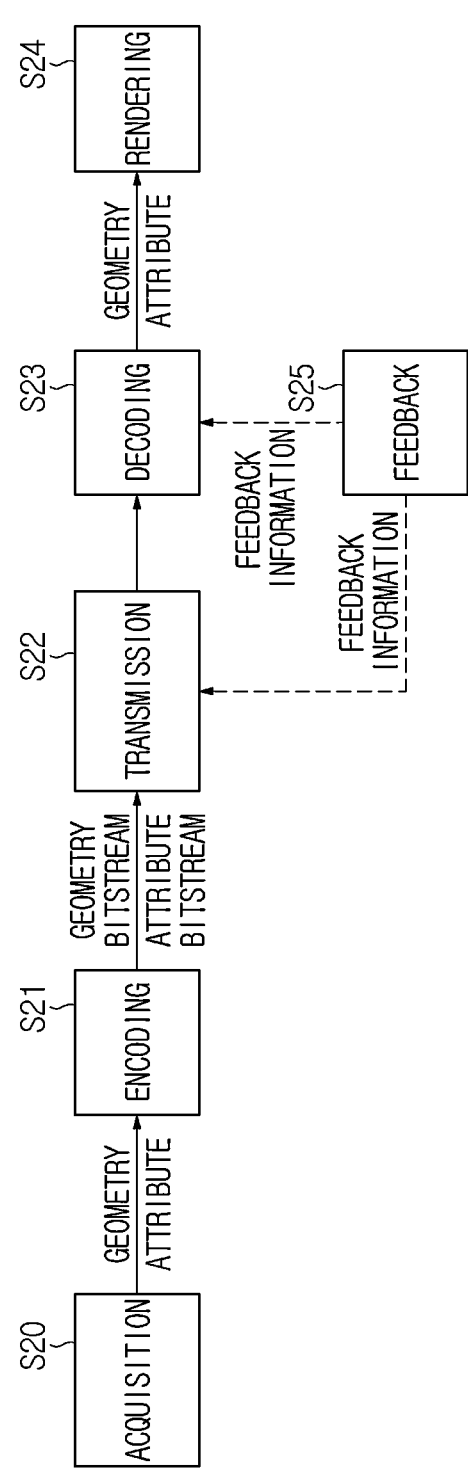
FIG. 2 is a block diagram illustrating an example of a process of providing point cloud content according to embodiments of the present disclosure.

FIG. 1 illustrates an example of a system for providing point cloud content (hereinafter, referred to as a 'point cloud content provision system') according to embodiments of the present disclosure. FIG. 2 illustrates an example of a process in which the point cloud content provision system provides point cloud content.

As shown in FIG. 1, the point cloud content provision system may include a transmission device 10 and a reception device 20. The point cloud content provision system may perform an acquisition process S20, an encoding process S21, a transmission process S22, a decoding process S23, a rendering process S24 and/or a feedback process S25 shown in FIG. 2 by operation of the transmission device 10 and the reception device 20.

The transmission device 10 acquires point cloud data and outputs a bitstream through a series of processes (e.g., encoding process) for the acquired point cloud data (source point cloud data), in order to provide point cloud content. Here, the point cloud data may be output in the form of a bitstream through an encoding process. In some embodiments, the transmission device 10 may transmit the output bitstream in the form of a file or streaming (streaming segment) to the reception device 20 through a digital storage medium or a network. The digital storage medium may include a variety of storage media such as USB, SD, CD, DVD, Blu-ray, HDD, and SSD. The reception device 20 may process (e.g., decode or reconstruct) the received data (e.g., encoded point cloud data) into source point cloud data and render it. The point cloud content may be provided to the user through these processes, and the present disclosure may provide various embodiments necessary to effectively perform a series of these processes.

As illustrated in FIG. 1, the transmission device 10 may include an acquisition unit 11, an encoding unit 12, an encapsulation processing unit 13 and a transmission unit 14, and the reception device 20 may include a reception unit 21, a decapsulation processing unit 22, a decoding unit 23, and a rendering unit 24.

The acquisition unit 11 may perform a process S20 of acquiring a point cloud video through a capturing, synthesizing or generating process. Accordingly, the acquisition unit 11 may be referred to as a 'point cloud video acquisition unit'.

Point cloud data (geometry and/or attribute, etc.) for a plurality of points may be generated by the acquisition process (S20). Also, through the acquisition process (S20), metadata related to the acquisition of the point cloud video may be generated. Also, mesh data (e.g., triangular data) indicating connection information between point clouds may be generated by the acquisition process (S20).

The metadata may include initial viewing orientation metadata. The initial viewing orientation metadata may indicate whether the point cloud data is data representing the front or the back. The metadata may be referred to as "auxiliary data" that is metadata for the point cloud.

The acquired point cloud video may include the polygon file format or the Stanford triangle format (PLY) file. Since the point cloud video has one or more frames, the acquired point cloud video may include one or more PLY files. The PLY file may include point cloud data of each point.

In order to acquire a point cloud video (or point cloud data), the acquisition unit 11 may be composed of a combination of camera equipment capable of acquiring depth (depth information) and RGB cameras capable of extracting color information corresponding to the depth information. Here, the camera equipment capable of acquiring the depth information may be a combination of an infrared pattern projector and an infrared camera. In addition, the acquisition unit 11 may be composed of a LiDAR, and the LiDAR may use a radar system for measuring the position coordinates of a reflector by measuring a time required for a laser pulse to be emitted and returned after being reflected.

The acquisition unit 110 may extract a shape of geometry composed of points in a three-dimensional space from the depth information, and may extract an attribute representing a color or reflection of each point from the RGB information.

As a method of extracting (or capturing, acquiring, etc.) a point cloud video (or point cloud data), there may be an inward-facing method of capturing a central object and an outward-facing method of capturing an external environment.

The encoding unit 12 may perform the encoding process (S21) of encoding the data (e.g., geometry, attribute and/or metadata, and/or mesh data, etc.) generated by the acquisition unit 11 into one or more bitstreams. Accordingly, the encoding unit 12 may be referred to as a 'point cloud video encoder'. The encoding unit 12 may encode the data generated by the acquisition unit 11 in series or in parallel.

The encoding process S21 performed by the encoding unit 12 may be geometry-based point cloud compression (G-PCC). The encoding unit 12 may perform a series of procedures such as prediction, transform, quantization, and entropy coding for compression and coding efficiency.

The encoded point cloud data may be output in the form of a bitstream. Based on the G-PCC procedure, the encoding unit 12 may partition the point cloud data into geometry and attribute and encode them as described below. In this case, the output bitstream may include a geometry bitstream including the encoded geometry and an attribute bitstream including the encoded attribute. In addition, the output bitstream may further include one or more of a metadata bitstream including metadata, an auxiliary bitstream including auxiliary data, and a mesh data bitstream including mesh data. The encoding process (S21) will be described in more detail below. A bitstream including the encoded point cloud data may be referred to as a 'point cloud bitstream' or a 'point cloud video bitstream'.

The encapsulation processing unit 13 may perform a process of encapsulating one or more bitstreams output from the decoding unit 12 in the form of a file or a segment. Accordingly, the encapsulation processing unit 13 may be referred to as a 'file/segment encapsulation module'. Although the drawing shows an example in which the encapsulation processing unit 13 is composed of a separate component/module in relation to the transmission unit 14, the encapsulation processing unit 13 may be included in the transmission unit 14 in some embodiments.

The encapsulation processing unit 13 may encapsulate the data in a file format such as ISO Base Media File Format (ISOBMFF) or process the data in the form of other DASH segments. In some embodiments, the encapsulation processing unit 13 may include metadata in a file format. Metadata may be included, for example, in boxes of various levels in the ISOBMFF file format, or as data in a separate track within the file. In some embodiments, the encapsulation processing unit 130 may encapsulate the metadata itself into a file. The metadata processed by the encapsulation processing unit 13 may be transmitted from a metadata processing unit not shown in the drawing. The metadata processing unit may be included in the encoding unit 12 or may be configured as a separate component/module.

The transmission unit 14 may perform the transmission process (S22) of applying processing (processing for transmission) according to a file format to the 'encapsulated point cloud bitstream'. The transmission unit 140 may transmit the bitstream or a file/segment including the bitstream to the reception unit 21 of the reception device 20 through a digital storage medium or a network. Accordingly, the transmission unit 14 may be referred to as a 'transmitter' or a 'communication module'.

The reception unit 21 may receive the bitstream transmitted by the transmission device 10 or a file/segment including the bitstream. Depending on the transmitted channel, the reception unit 21 may receive a bitstream or a file/segment including the bitstream through a broadcast network, or may receive a bitstream or a file/segment including the bitstream through a broadband. Alternatively, the reception unit 21 may receive a bitstream or a file/segment including the bitstream through a digital storage medium.

The reception unit 21 may perform processing according to a transmission protocol on the received bitstream or the file/segment including the bitstream. The reception unit 21 may perform a reverse process of transmission processing (processing for transmission) to correspond to processing for transmission performed by the transmission device 10. The reception unit 21 may transmit the encoded point cloud data among the received data to the decapsulation processing unit

22 and may transmit metadata to a metadata parsing unit. The metadata may be in the form of a signaling table. In some embodiments, the reverse process of the processing for transmission may be performed in the reception processing unit. Each of the reception processing unit, the decapsulation processing unit 22, and the metadata parsing unit may be included in the reception unit 21 or may be configured as a component/module separate from the reception unit 21.

The decapsulation processing unit 22 may decapsulate the point cloud data (i.e., a bitstream in a file format) in a file format received from the reception unit 21 or a reception processing unit. Accordingly, the decapsulation processing unit 22 may be referred to as a 'file/segment decapsulation module'.

The decapsulation processing unit 22 may acquire a point cloud bitstream or a metadata bitstream by decapsulating files according to ISOBMFF or the like. In some embodiments, metadata (metadata bitstream) may be included in the point cloud bitstream. The acquired point cloud bitstream may be transmitted to the decoding unit 23, and the acquired metadata bitstream may be transmitted to the metadata processing unit. The metadata processing unit may be included in the decoding unit 23 or may be configured as a separate component/module. The metadata obtained by the decapsulation processing unit 23 may be in the form of a box or track in a file format. If necessary, the decapsulation processing unit 23 may receive metadata required for decapsulation from the metadata processing unit. The metadata may be transmitted to the decoding unit 23 and used in the decoding process (S23), or may be transmitted to the rendering unit 24 and used in the rendering process (S24).

The decoding unit 23 may receive the bitstream and perform operation corresponding to the operation of the encoding unit 12, thereby performing the decoding process (S23) of decoding the point cloud bitstream (encoded point cloud data). Accordingly, the decoding unit 23 may be referred to as a 'point cloud video decoder'.

The decoding unit 23 may partition the point cloud data into geometry and attribute and decode them. For example, the decoding unit 23 may reconstruct (decode) geometry from a geometry bitstream included in the point cloud bitstream, and restore (decode) attribute based on the reconstructed geometry and an attribute bitstream included in the point cloud bitstream. A three-dimensional point cloud video/image may be reconstructed based on position information according to the reconstructed geometry and attribute (such as color or texture) according to the decoded attribute. The decoding process (S23) will be described in more detail below.

The rendering unit 24 may perform the rendering process S24 of rendering the reconstructed point cloud video. Accordingly, the rendering unit 24 may be referred to as a 'renderer'.

The rendering process S24 may refer to a process of rendering and displaying point cloud content in a 3D space. The rendering process S24 may perform rendering according to a desired rendering method based on the position information and attribute information of the points decoded through the decoding process.

The feedback process S25 may include a process of transmitting various feedback information that may be acquired during the rendering process S24 or the display process to the transmission device 10 or to other components in the reception device 20. The feedback process S25 may be performed by one or more of the components included in the reception device 20 of FIG. 1 or may be performed by one or more of the components shown in FIGS. 7 and 8. In some embodiments, the feedback process S25 may be performed by a 'feedback unit' or a 'sensing/tracking unit'.

Overview of Point Cloud Encoding Apparatus

Figure 3:
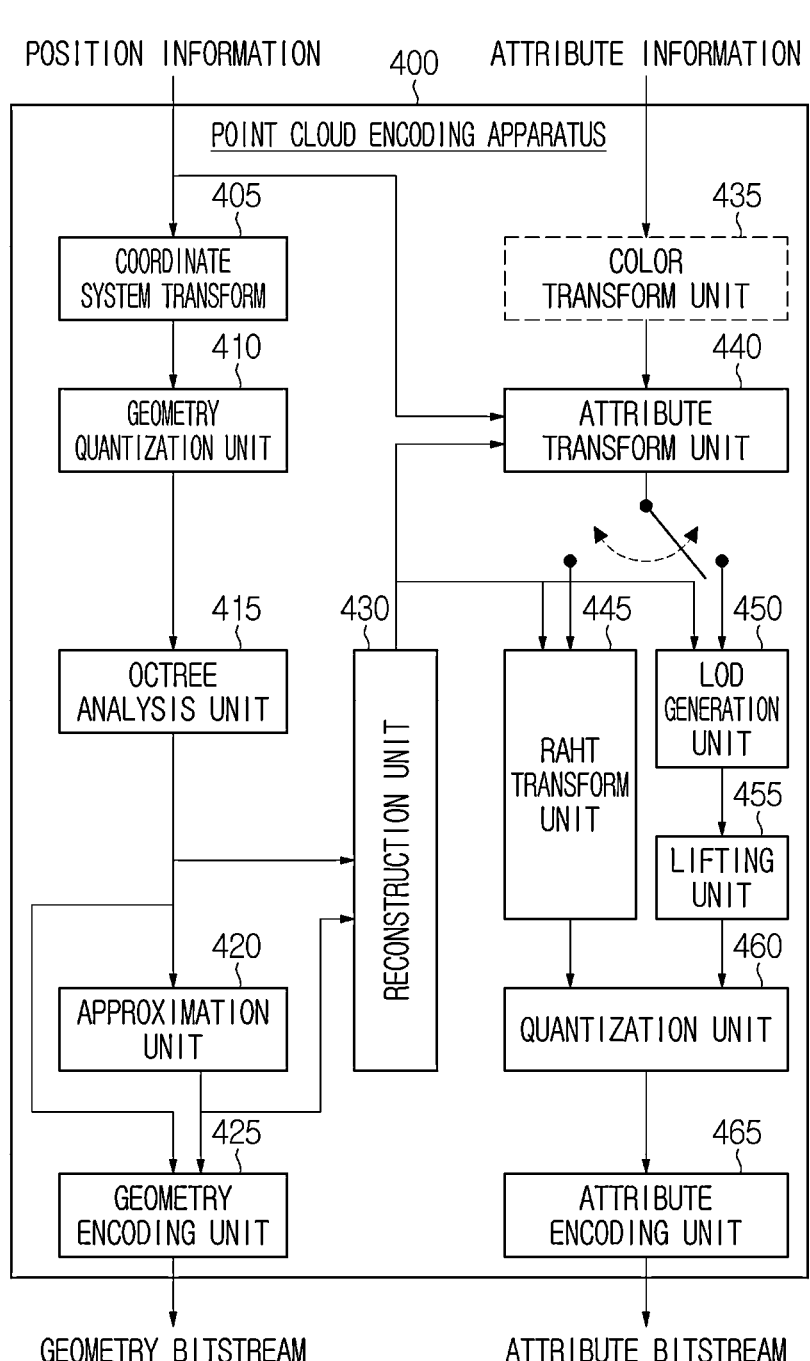
FIG. 3 illustrates an example of a point cloud encoding apparatus according to embodiments of the present disclosure.
Figure 6:
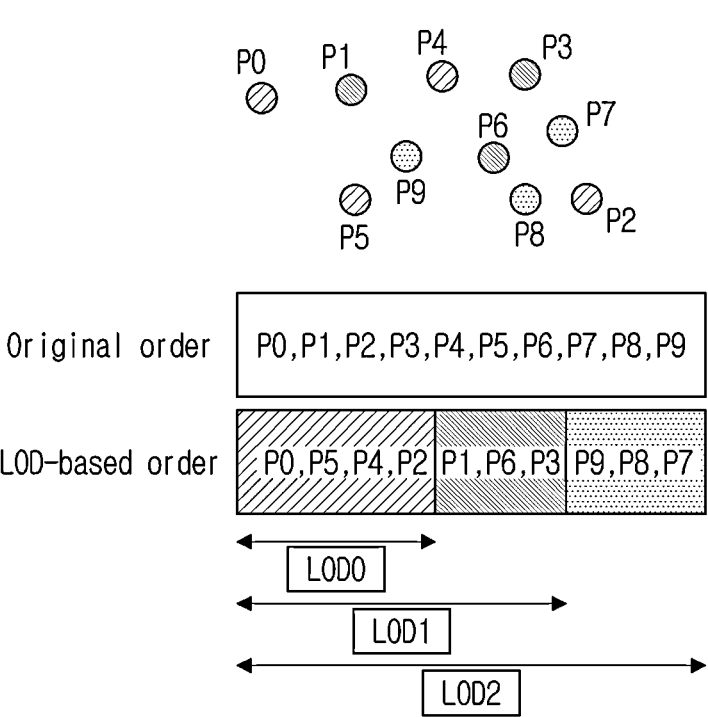
FIG. 6 illustrates an example of a point configuration for each LOD according to embodiments of the present disclosure.

FIG. 3 illustrates an example of a point cloud encoding apparatus 400 according to embodiments of the present disclosure. The point cloud encoding apparatus 400 of FIG. 3 may correspond to the encoding unit 12 of FIG. 1 in terms of the configuration and function.

As shown in FIG. 3, the point cloud encoding apparatus 400 may include a coordinate system transform unit 405, a geometry quantization unit 410, an octree analysis unit 415, an approximation unit 420, a geometry encoding unit 425, a reconstruction unit 430, and an attribute transform unit 440, a RAHT transform unit 445, an LOD generation unit 450, a lifting unit 455, an attribute quantization unit 460, an attribute encoding unit 465, and/or a color transform unit 435.

The point cloud data acquired by the acquisition unit 11 may undergo processes of adjusting the quality of the point cloud content (e.g., lossless, lossy, near-lossless) according to the network situation or application. In addition, each point of the acquired point cloud content may be transmitted without loss, but, in that case, real-time streaming may not be possible because the size of the point cloud content is large. Therefore, in order to provide the point cloud content smoothly, a process of reconstructing the point cloud content according to a maximum target bitrate is required.

Processes of adjusting the quality of the point cloud content may be processes of reconstructing and encoding the position information (position information included in the geometry information) or color information (color information included in the attribute information) of the points. A process of reconstructing and encoding position information of points may be referred to as geometry coding, and a process of reconstructing and encoding attribute information associated with each point may be referred to as attribute coding.

Geometry coding may include a geometry quantization process, a voxelization process, an octree analysis process, an approximation process, a geometry encoding process, and/or a coordinate system transform process. Also, geometry coding may further include a geometry reconstruction process. Attribute coding may include a color transform process, an attribute transform process, a prediction transform process, a lifting transform process, a RAHT transform process, an attribute quantization process, an attribute encoding process, and the like.

Geometry Coding

The coordinate system transform process may correspond to a process of transforming a coordinate system for positions of points. Therefore, the coordinate system transform process may be referred to as 'transform coordinates'. The coordinate system transform process may be performed by the coordinate system transform unit 405. For example, the coordinate system transform unit 405 may transform the positions of the points from the global space coordinate system to position information in a three-dimensional space (e.g., a three-dimensional space expressed in coordinate system of the X-axis, Y-axis, and Z-axis). Position information in the 3D space according to embodiments may be referred to as 'geometry information'.

The geometry quantization process may correspond to a process of quantizing the position information of points, and may be performed by the geometry quantization unit 410. For example, the geometry quantization unit 410 may find position information having minimum (x, y, z) values among the position information of the points, and subtract position information having the minimum (x, y, z) positions from the position information of each point. In addition, the geometry quantization unit 410 may multiply the subtracted value by a preset quantization scale value, and then adjust (lower or raise) the result to a near integer value, thereby performing the quantization process.

The voxelization process may correspond to a process of matching geometry information quantized through the quantization process to a specific voxel present in a 3D space. The voxelization process may also be performed by the geometry quantization unit 410. The geometry quantization unit 410 may perform octree-based voxelization based on position information of the points, in order to reconstruct each point to which the quantization process is applied.

An example of a voxel according to embodiments of the present disclosure is shown in FIG. 4. A voxel may mean a space for storing information on points present in 3D, similarly to a pixel, which is a minimum unit having information on a 2D image/video. The voxel is a hybrid word obtained by combining a volume and a pixel. As illustrated in FIG. 4, a voxel refers to a three-dimensional cubic space formed by partitioning a three-dimensional space (2depth, 2depth, 2depth) to become a unit (unit=1.0) based on each axis (x-axis, y-axis, and z-axis). The voxel may estimate spatial coordinates from a positional relationship with a voxel group, and may have color or reflectance information similarly to a pixel.

Only one point may not exist (match) in one voxel. That is, information related to a plurality of points may exist in one voxel. Alternatively, information related to a plurality of points included in one voxel may be integrated into one point information. Such adjustment can be performed selectively. When one voxel is integrated and expressed as one point information, the position value of the center point of the voxel may be set based on the position values of points existing in the voxel, and an attribute transform process related thereto needs to be performed. For example, the attribute transform process may be adjusted to the position value of points included in the voxel or the center point of the voxel, and the average value of the color or reflectance of neighbor points within a specific radius.

The octree analysis unit 415 may use an octree to efficiently manage the area/position of the voxel. An example of an octree according to embodiments of the present disclosure is shown in (a) of FIG. 5. In order to efficiently manage the space of a two-dimensional image, if the entire space is partitioned based on the x-axis and y-axis, four spaces are created, and, when each of the four spaces is partitioned based on the x-axis and y-axis, four spaces are created for each small space. An area may be partitioned until a leaf node becomes a pixel, and a quadtree may be used as a data structure for efficient management according to the size and position of the area.

Likewise, the present disclosure may apply the same method to efficiently manage a 3D space according to the position and size of the space. However, as shown in the middle of (a) of FIG. 5, since the z-axis is added, 8 spaces may be created when the three-dimensional space is partitioned based on the x-axis, the y-axis, and the z-axis. In addition, as shown on the right side of (a) of FIG. 5, when each of the eight spaces is partitioned again based on the x-axis, the y-axis, and the z-axis, eight spaces may be created for each small space.

The octree analysis unit 415 may partition the area until the leaf node becomes a voxel, and may use an octree data structure capable of managing eight children node areas for efficient management according to the size and position of the area.

The octree may be expressed as an occupancy code, and an example of the occupancy code according to embodiments of the present disclosure is shown in (b) of FIG. 5. The octree analysis unit 415 may express the occupancy code of the node as 1 when a point is included in each node and express the occupancy code of the node as 0 when the point is not included.

The geometry encoding process may correspond to a process of performing entropy coding on the occupancy code. The geometry encoding process may be performed by the geometry encoding unit 425. The geometry encoding unit 425 may perform entropy coding on the occupancy code. The generated occupancy code may be immediately encoded or may be encoded through an intra/inter coding process to increase compression efficiency. The reception device 20 may reconstruct the octree through the occupancy code.

On the other hand, in the case of a specific area having no points or very few points, it may be inefficient to voxelize all areas. That is, since there are few points in a specific area, it may not be necessary to construct the entire octree. For this case, an early termination method may be required.

The point cloud encoding apparatus 400 may directly transmit the positions of points only for the specific area, or reconfigure positions of points within the specific area based on the voxel using a surface model, instead of partitioning a node (specific node) corresponding to this specific area into 8 sub-nodes (children nodes) for the specific area (a specific area that does not correspond to a leaf node).

A mode for directly transmitting the position of each point for a specific node may be a direct mode. The point cloud encoding apparatus 400 may check whether conditions for enabling the direct mode are satisfied.

The conditions for enabling the direct mode are: 1) the option to use the direct mode shall be enabled, 2) the specific node does not correspond to a leaf node, and 3) points below a threshold shall exist within the specific node, and 4) the total number of points to be directly transmitted does not exceed a limit value.

When all of the above conditions are satisfied, the point cloud encoding apparatus 400 may entropy-code and transmit the position value of the point directly for the specific node through the geometry encoding unit 425.

A mode in which a position of a point in a specific area is reconstructed based on a voxel using a surface model may be a trisoup mode. The trisoup mode may be performed by the approximation unit 420. The approximation unit 420 may determine a specific level of the octree and reconstruct the positions of points in the node area based on the voxel using the surface model from the determined specific level.

The point cloud encoding apparatus 400 may selectively apply the trisoup mode. Specifically, the point cloud encoding apparatus 400 may designate a level (specific level) to which the trisoup mode is applied, when the trisoup mode is used. For example, when the specified specific level is equal to the depth (d) of the octree, the trisoup mode may not be applied. That is, the designated specific level shall be less than the depth value of the octree.

A three-dimensional cubic area of nodes of the designated specific level is called a block, and one block may include one or more voxels. A block or voxel may correspond to a brick. Each block may have 12 edges, and the approximation unit 420 may check whether each edge is adjacent to an occupied voxel having a point. Each edge may be adjacent to several occupied voxels. A specific position of an edge adjacent to a voxel is called a vertex, and, when a plurality of occupied voxels are adjacent to one edge, the approximation unit 420 may determine an average position of the positions as a vertex.

The point cloud encoding apparatus 400 may entropy-code the starting points (x, y, z) of the edge, the direction vector ($\Delta x$, $\Delta y$, $\Delta z$) of the edge and position value of the vertex (relative position values within the edge) through the geometry encoding unit 425, when a vertex is present.

The geometry reconstruction process may correspond to a process of generating a reconstructed geometry by reconstructing an octree and/or an approximated octree. The geometry reconstruction process may be performed by the reconstruction unit 430. The reconstruction unit 430 may perform a geometry reconstruction process through triangle reconstruction, up-sampling, voxelization, and the like.

When the trisoup mode is applied in the approximation unit 420, the reconstruction unit 430 may reconstruct a triangle based on the starting point of the edge, the direction vector of the edge and the position value of the vertex.

The reconstruction unit 430 may perform an upsampling process for voxelization by adding points in the middle along the edge of the triangle. The reconstruction unit 430 may generate additional points based on an upsampling factor and the width of the block. These points may be called refined vertices. The reconstruction unit 430 may voxel the refined vertices, and the point cloud encoding apparatus 400 may perform attribute coding based on the voxelized position value.

In some embodiments, the geometry encoding unit 425 may increase compression efficiency by applying context adaptive arithmetic coding. The geometry encoding unit 425 may directly entropy-code the occupancy code using the arithmetic code. In some embodiments, the geometry encoding unit 425 adaptively performs encoding based on occupancy of neighbor nodes (intra coding), or adaptively performs encoding based on the occupancy code of a previous frame (inter-coding). Here, the frame may mean a set of point cloud data generated at the same time. Intra coding and inter coding are optional processes and thus may be omitted.

Attribute Coding

Attribute coding may correspond to a process of coding attribute information based on reconstructed geometry and geometry before coordinate system transform (source geometry). Since the attribute may be dependent on the geometry, the reconstructed geometry may be utilized for attribute coding.

As described above, the attribute may include color, reflectance, and the like. The same attribute coding method may be applied to information or parameters included in the attribute. Color has three elements, reflectance has one element, and each element can be processed independently.

Attribute coding may include a color transform process, an attribute transform process, a prediction transform process, a lifting transform process, a RAHT transform process, an attribute quantization process, an attribute encoding process, and the like. The prediction transform process, the lifting transform process, and the RAHT transform process may be selectively used, or a combination of one or more thereof may be used.

The color transform process may correspond to a process of transforming the format of the color in the attribute into another format. The color transform process may be performed by the color transform unit 435. That is, the color transform unit 435 may transform the color in the attribute. For example, the color transform unit 435 may perform a coding operation for transforming the color in the attribute from RGB to YCbCr. In some embodiments, the operation of the color transform unit 435, that is, the color transform process, may be optionally applied according to a color value included in the attribute.

As described above, when one or more points exist in one voxel, position values for points existing in the voxel are set to the center point of the voxel in order to display them by integrating them into one point information for the voxel. Accordingly, a process of transforming the values of attributes related to the points may be required. Also, even when the trisoup mode is performed, the attribute transform process may be performed.

The attribute transform process may correspond to a process of transforming the attribute based on a position on which geometry coding is not performed and/or reconstructed geometry. For example, the attribute transform process may correspond to a process of transforming the attribute having a point of the position based on the position of a point included in a voxel. The attribute transform process may be performed by the attribute transform unit 440.

The attribute transform unit 440 may calculate the central position value of the voxel and an average value of the attribute values of neighbor points within a specific radius. Alternatively, the attribute transform unit 440 may apply a weight according to a distance from the central position to the attribute values and calculate an average value of the attribute values to which the weight is applied. In this case, each voxel has a position and a calculated attribute value.

The prediction transform process may correspond to a process of predicting an attribute value of a current point based on attribute values of one or more points (neighbor points) adjacent to the current point (a point corresponding to a prediction target). The prediction transform process may be performed by a level-of-detail (LOD) generation unit 450.

Prediction transform is a method to which the LOD transform technique is applied, and the LOD generation unit 450 may calculate and set the LOD value of each point based on the LOD distance value of each point.

The LOD generation unit 450 may generate a predictor for each point for prediction transform. Accordingly, when there are N points, N predictors may be generated. The predictor may calculate and set a weight value (=1/distance) based on the LOD value for each point, the indexing information for the neighbor points, and distance values from the neighbor points. Here, the neighbor points may be points existing within a distance set for each LOD from the current point.

In addition, the predictor may multiply the attribute values of neighbor points by the 'set weight value', and set a value obtained by averaging the attribute values multiplied by the weight value as the predicted attribute value of the current point. An attribute quantization process may be performed on a residual attribute value obtained by subtracting the predicted attribute value of the current point from the attribute value of the current point.

The lifting transform process may correspond to a process of reconstructing points into a set of detail levels through the LOD generation process, like the prediction transform process. The lifting transform process may be performed by the lifting unit 455. The lifting transform process may also include a process of generating a predictor for each point, a process of setting the calculated LOD in the predictor, a process of registering neighbor points, and a process of setting a weight according to distances between the current point and the neighbor points.

The RAHT transform process may correspond to a method of predicting attribute information of nodes at a higher level using attribute information associated with a node at a lower level of the octree. That is, the RAHT transform process may correspond to an attribute information intra coding method through octree backward scan. The RAHT transform process may be performed by the RAHT transform unit 445.

The RAHT transform unit 445 scans the entire area in the voxel, and may perform the RAHT transform process up to the root node while summing (merging) the voxel into a larger block at each step. Since the RAHT transform unit 445 performs a RAHT transform process only on an occupied node, in the case of an empty node that is not occupied, the RAHT transform process may be performed on a node at a higher level immediately above it.

The attribute quantization process may correspond to a process of quantizing the attribute output from the RAHT transform unit 445, the LOD generation unit 450, and/or the lifting unit 455. The attribute quantization process may be performed by the attribute quantization unit 460. The attribute encoding process may correspond to a process of encoding a quantized attribute and outputting an attribute bitstream. The attribute encoding process may be performed by the attribute encoding unit 465.

Overview of Point Cloud Decoding Apparatus

Figure 7:
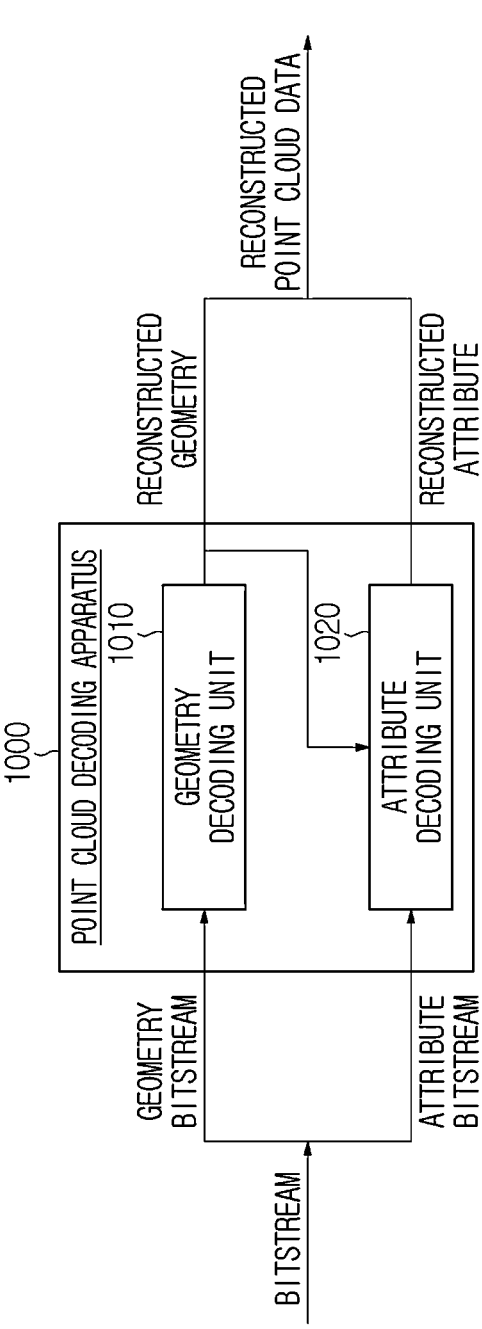
FIG. 7 is a block diagram illustrating an example of a point cloud decoding apparatus according to embodiments of the present disclosure.

FIG. 7 illustrates an example of a point cloud decoding apparatus 1000 according to an embodiment of the present disclosure. The point cloud decoding apparatus 1000 of FIG. 7 may correspond to the decoding unit 23 of FIG. 1 in terms of configuration and function.

The point cloud decoding apparatus 1000 may perform a decoding process based on data (bitstream) transmitted from the transmission device 10. The decoding process may include a process of reconstructing (decoding) a point cloud video by performing operation corresponding to the above-described encoding operation on the bitstream.

As illustrated in FIG. 7, the decoding process may include a geometry decoding process and an attribute decoding process. The geometry decoding process may be performed by a geometry decoding unit 1010, and an attribute decoding process may be performed by an attribute decoding unit 1020. That is, the point cloud decoding apparatus 1000 may include the geometry decoding unit 1010 and the attribute decoding unit 1020.

The geometry decoding unit 1010 may reconstruct geometry from a geometry bitstream, and the attribute decoder 1020 may reconstruct attribute based on the reconstructed geometry and the attribute bitstream. Also, the point cloud decoding apparatus 1000 may reconstruct a three-dimensional point cloud video (point cloud data) based on position information according to the reconstructed geometry and attribute information according to the reconstructed attribute.

FIG. 8 illustrates a specific example of a point cloud decoding apparatus 1100 according to another embodiment of the present disclosure. As illustrated in FIG. 8, the point cloud decoding apparatus 1100 includes a geometry decoding unit 1105, an octree synthesis unit 1110, an approximation synthesis unit 1115, a geometry reconstruction unit 1120, and a coordinate system inverse transform unit 1125, an attribute decoding unit 1130, an attribute dequantization unit 1135, a RAHT transform unit 1150, an LOD generation unit 1140, an inverse lifting unit 1145, and/or a color inverse transform unit 1155.

The geometry decoding unit 1105, the octree synthesis unit 1110, the approximation synthesis unit 1115, the geometry reconstruction unit 1120 and the coordinate system inverse transform unit 1150 may perform geometry decoding. Geometry decoding may be performed as a reverse process of the geometry coding described with reference to FIGS. 1 to 6. Geometry decoding may include direct coding and trisoup geometry decoding. Direct coding and trisoup geometry decoding may be selectively applied.

The geometry decoding unit 1105 may decode the received geometry bitstream based on arithmetic coding. Operation of the geometry decoding unit 1105 may correspond to a reverse process of operation performed by the geometry encoding unit 435.

The octree synthesis unit 1110 may generate an octree by obtaining an occupancy code from the decoded geometry bitstream (or information on a geometry obtained as a result of decoding). Operation of the octree synthesis unit 1110 may correspond to a reverse process of operation performed by the octree analysis unit 415.

The approximation synthesis unit 1115 may synthesize a surface based on the decoded geometry and/or the generated octree, when trisoup geometry encoding is applied.

The geometry reconstruction unit 1120 may reconstruct geometry based on the surface and the decoded geometry. When direct coding is applied, the geometry reconstruction unit 1120 may directly bring and add position information of points to which direct coding is applied. In addition, when trisoup geometry encoding is applied, the geometry reconstruction unit 1120 may reconstruct the geometry by performing reconstruction operation, for example, triangle reconstruction, up-sampling, voxelization operation and the like. The reconstructed geometry may include a point cloud picture or frame that does not include attributes.

The coordinate system inverse transform unit 1150 may acquire positions of points by transforming the coordinate system based on the reconstructed geometry. For example, the coordinate system inverse transform unit 1150 may inversely transform the positions of points from a three-dimensional space (e.g., a three-dimensional space expressed by the coordinate system of X-axis, Y-axis, and Z-axis, etc.) to position information of the global space coordinate system.

The attribute decoding unit 1130, the attribute dequantization unit 1135, the RAHT transform unit 1230, the LOD generation unit 1140, the inverse lifting unit 1145, and/or the color inverse transform unit 1250 may perform attribute decoding. Attribute decoding may include RAHT transform decoding, prediction transform decoding, and lifting transform decoding. The above three decoding may be used selectively, or a combination of one or more decoding may be used.

The attribute decoding unit 1130 may decode an attribute bitstream based on arithmetic coding. For example, when there is no neighbor point in the predictor of each point and thus the attribute value of the current point is directly entropy-encoded, the attribute decoding unit 1130 may decode the attribute value (non-quantized attribute value) of the current point. As another example, when there are neighbor points in the predictor of the current points and thus the quantized residual attribute value is entropy-encoded, the attribute decoding unit 1130 may decode the quantized residual attribute value.

The attribute dequantization unit 1135 may dequantize the decoded attribute bitstream or information on the attribute obtained as a result of decoding, and output dequantized attributes (or attribute values). For example, when the quantized residual attribute value is output from the attribute decoding unit 1130, the attribute dequantization unit 1135 may dequantize the quantized residual attribute value to output the residual attribute value. The dequantization process may be selectively applied based on whether the attribute is encoded in the point cloud encoding apparatus 400. That is, when there is no neighbor point in the predictor of each point and thus the attribute value of the current point is directly encoded, the attribute decoding unit 1130 may output the attribute value of the current point that is not quantized, and the attribute encoding process may be skipped.

The RAHT transform unit 1150, the LOD generation unit 1140, and/or the inverse lifting unit 1145 may process the reconstructed geometry and dequantized attributes. The RAHT transform unit 1150, the LOD generation unit 1140, and/or the inverse lifting unit 1145 may selectively perform decoding operation corresponding to the encoding operation of the point cloud encoding apparatus 400.

The color inverse transform unit 1155 may perform inverse transform coding for inverse transforming s color value (or texture) included in the decoded attributes. Operation of the inverse color transform unit 1155 may be selectively performed based on whether the color transform unit 435 operates.

Figure 9:
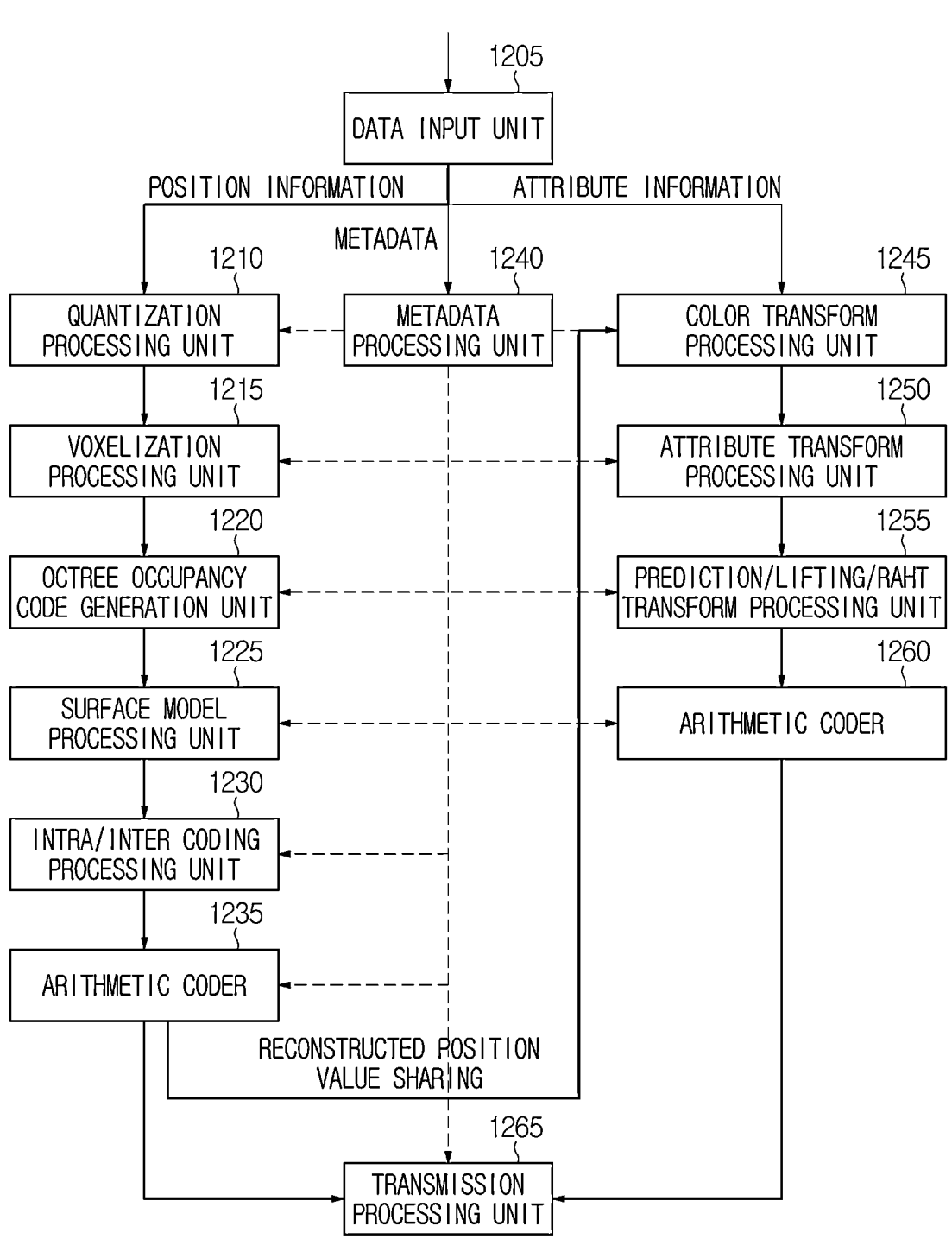
FIG. 9 is a block diagram illustrating another example of a transmission device according to embodiments of the present disclosure.

FIG. 9 shows another example of a transmission device according to embodiments of the present disclosure. As illustrated in FIG. 9, the transmission device may include a data input unit 1205, a quantization processing unit 1210, a voxelization processing unit 1215, an octree occupancy code generation unit 1220, a surface model processing unit 1225, an intra/inter coding processing unit 1230, an arithmetic coder 1235, a metadata processing unit 1240, a color transform processing unit 1245, an attribute transform processing unit 1250, a prediction/lifting/RAHT transform processing unit 1255, an arithmetic coder 1260 and a transmission processing unit 1265.

A function of the data input unit 1205 may correspond to an acquisition process performed by the acquisition unit 11 of FIG. 1. That is, the data input unit 1205 may acquire a point cloud video and generate point cloud data for a plurality of points. Geometry information (position information) in the point cloud data may be generated in the form of a geometry bitstream through the quantization processing unit 1210, the voxelization processing unit 1215, the octree occupancy code generation unit 1220, the surface model processing unit 1225, the intra/inter coding processing unit 1230 and the arithmetic coder 1235. Attribute information in the point cloud data may be generated in the form of an attribute bitstream through the color transform processing unit 1245, the attribute transform processing unit 1250, the prediction/lifting/RAHT transform processing unit 1255, and the arithmetic coder 1260. The geometry bitstream, the attribute bitstream, and/or the metadata bitstream may be transmitted to the reception device through the processing of the transmission processing unit 1265.

Specifically, the function of the quantization processing unit 1210 may correspond to the quantization process performed by the geometry quantization unit 410 of FIG. 3 and/or the function of the coordinate system transform unit 405. The function of the voxelization processing unit 1215 may correspond to the voxelization process performed by the geometry quantization unit 410 of FIG. 3, and the function of the octree occupancy code generation unit 1220 may correspond to the function performed by the octree analysis unit 415 of FIG. 3. The function of the surface model processing unit 1225 may correspond to the function performed by the approximation unit 420 of FIG. 3, and the function of the intra/inter coding processing unit 1230 and the function of the arithmetic coder 1235 may correspond to the functions performed by the geometry encoding unit 425 of FIG. 3. The function of the metadata processing unit 1240 may correspond to the function of the metadata processing unit described with reference to FIG. 1.

In addition, the function of the color transform processing unit 1245 may correspond to the function performed by the color transform unit 435 of FIG. 3, and the function of the attribute transform processing unit 1250 may correspond to the function performed by the attribute transform unit 440 of FIG. 3. The function of the prediction/lifting/RAHT transform processing unit 1255 may correspond to the functions performed by the RAHT transform unit 4450, the LOD generation unit 450, and the lifting unit 455 of FIG. 3, and the function of the arithmetic coder 1260 may correspond to the function of the attribute encoding unit 465 of FIG. 3. The function of the transmission processing unit 1265 may correspond to the function performed by the transmission unit 14 and/or the encapsulation processing unit 13 of FIG. 1.

Figure 10:
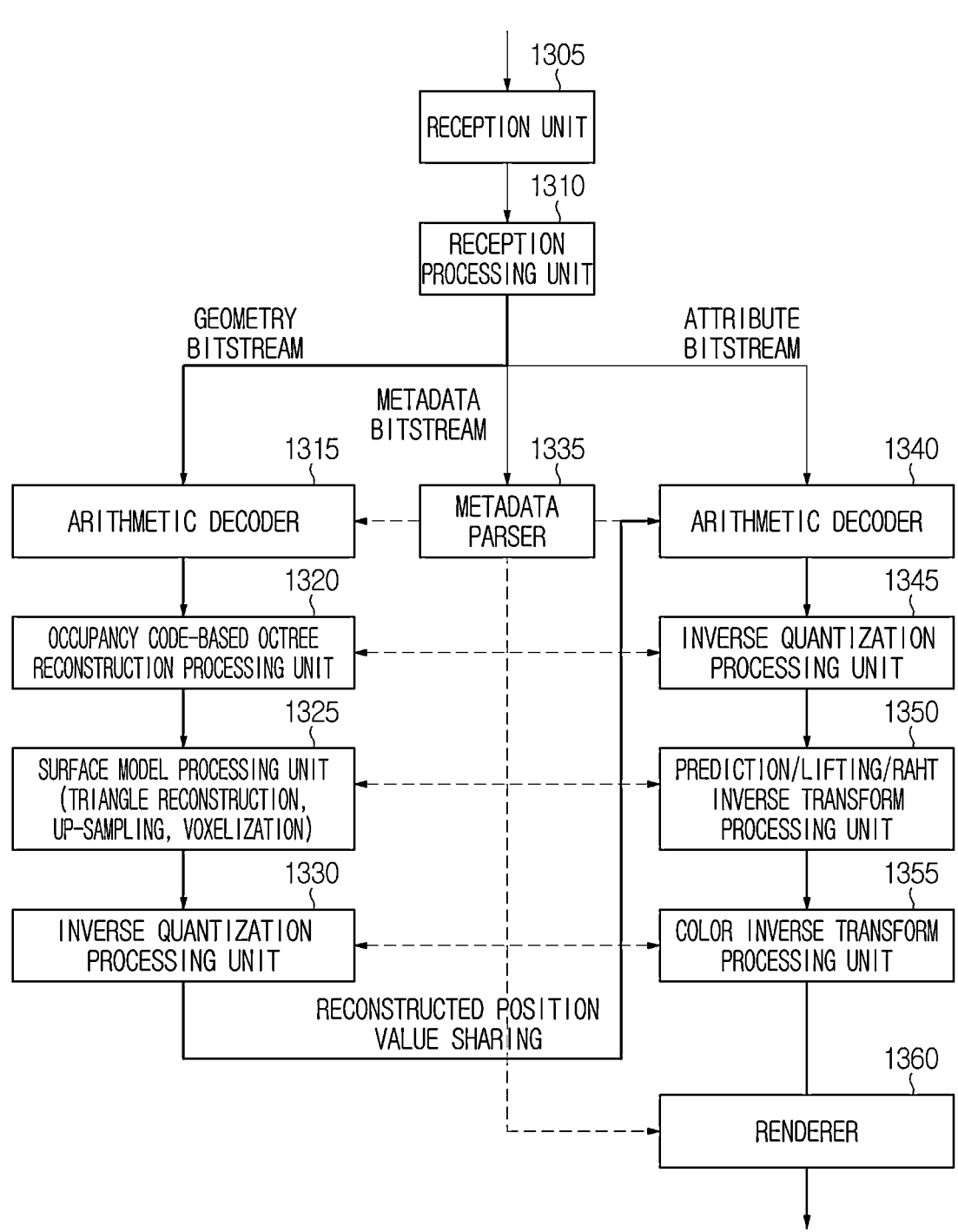
FIG. 10 is a block diagram illustrating another example of a reception device according to embodiments of the present disclosure.

FIG. 10 shows another example of a reception device according to embodiments of the present disclosure. As illustrated in FIG. 10, the reception device includes a reception unit 1305, a reception processing unit 1310, an arithmetic decoder 1315, a metadata parser 1335, an occupancy code-based octree reconstruction processing unit 1320, a surface model processing unit 1325, an inverse quantization processing unit 1330, an arithmetic decoder 1340, an inverse quantization processing unit 1345, a prediction/lifting/RAHT inverse transform processing unit 1350, a color inverse transform processing unit 1355, and a renderer 1360.

The function of the reception unit 1305 may correspond to the function performed by the reception unit 21 of FIG. 1, and the function of the reception processing unit 1310 may correspond to the function performed by the decapsulation processing unit 22 of FIG. 1. That is, the reception unit 1305 may receive a bitstream from the transmission processing unit 1265, and the reception processing unit 1310 may extract a geometry bitstream, an attribute bitstream, and/or a metadata bitstream through decapsulation processing. The geometry bitstream may be generated as a reconstructed position value (position information) through the arithmetic decoder 1315, the occupancy code-based octree reconstruction processing unit 1320, the surface model processing unit 1325, and the inverse quantization processing unit 1330. The attribute bitstream may be generated as a reconstructed attribute value through the arithmetic decoder 1340, the inverse quantization processing unit 1345, the prediction/lifting/RAHT inverse transform processing unit 1350, and the color inverse transform processing unit 1355. The metadata bitstream may be generated as reconstructed metadata (or meta data information) through the metadata parser 1335. The position value, attribute value, and/or metadata may be rendered in the renderer 1360 to provide the user with experiences such as VR/AR/MR/self-driving.

Specifically, the function of the arithmetic decoder 1315 may correspond to the function performed by the geometry decoding unit 1105 of FIG. 8, and the function of the occupancy code-based octree reconstruction unit 1320 may correspond to the function performed by the octree synthesis unit 1110 of FIG. 8. The function of the surface model processing unit 1325 may correspond to the function performed by the approximation synthesis unit of FIG. 8, and the function of the inverse quantization processing unit 1330 may correspond to the function performed by the geometry reconstruction unit 1120 and/or the coordinate system inverse transform unit 1125 of FIG. 8. The function of the metadata parser 1335 may correspond to the function performed by the metadata parser described with reference to FIG. 1.

In addition, the function of the arithmetic decoder 1340 may correspond to the function performed by the attribute decoding unit 1130 of FIG. 8, and the function of the inverse quantization processing unit 1345 may correspond to the function of the attribute inverse quantization unit 1135 of FIG. 8. The function of the prediction/lifting/RAHT inverse transform processing unit 1350 may correspond to the function performed by the RAHT transform unit 1150, the LOD generation unit 1140, and the inverse lifting unit 1145 of FIG. 11, and the function of the color inverse transform processing unit 1355 may correspond to the function performed by the color inverse transform unit 1155 of FIG. 8.

Figure 11:
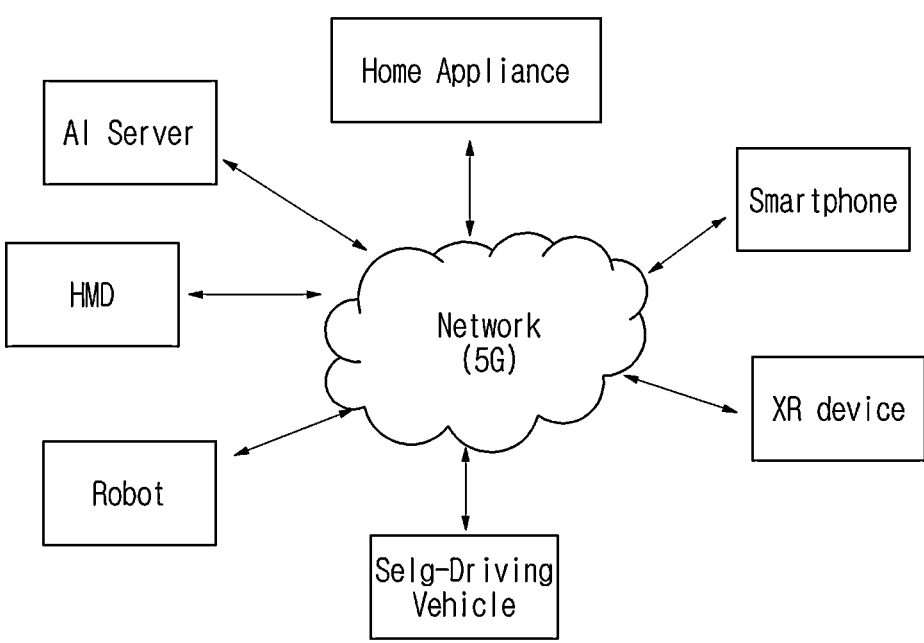
FIG. 11 illustrates an example of a structure capable of interworking with a method/device for transmitting and receiving point cloud data according to embodiments of the present disclosure.

FIG. 11 illustrates an example of a structure capable of interworking with a method/device for transmitting and receiving point cloud data according to embodiments of the present disclosure.

The structure of FIG. 11 illustrates a configuration in which at least one of a server (AI Server), a robot, a self-driving vehicle, an XR device, a smartphone, a home appliance and/or a HMD is connected to a cloud network. The robot, the self-driving vehicle, the XR device, the smartphone, or the home appliance may be referred to as a device. In addition, the XR device may correspond to a point cloud data device (PCC) according to embodiments or may interwork with the PCC device.

The cloud network may refer to a network that forms part of the cloud computing infrastructure or exists within the cloud computing infrastructure. Here, the cloud network may be configured using a 3G network, a 4G or Long Term Evolution (LTE) network, or a 5G network.

The server may be connected to at least one of the robot, the self-driving vehicle, the XR device, the smartphone, the home appliance, and/or the HMD through a cloud network, and may help at least a part of processing of the connected devices.

The HMD may represent one of the types in which an XR device and/or the PCC device according to embodiments may be implemented. The HMD type device according to the embodiments may include a communication unit, a control unit, a memory unit, an I/O unit, a sensor unit, and a power supply unit.

<PCC+XR>

The XR/PCC device may be implemented by a HMD, a HUD provided in a vehicle, a TV, a mobile phone, a smartphone, a computer, a wearable device, a home appliance, a digital signage, a vehicle, a fixed robot or a mobile robot, etc., by applying PCC and/or XR technology.

The XR/PCC device may obtain information on a surrounding space or a real object by analyzing 3D point cloud data or image data acquired through various sensors or from an external device to generate position (geometry) data and attribute data for 3D points, and render and output an XR object to be output. For example, the XR/PCC device may output an XR object including additional information on the recognized object in correspondence with the recognized object.

<PCC+XR+Mobile Phone>

The XR/PCC device may be implemented by a mobile phone or the like by applying PCC technology. A mobile phone can decode and display point cloud content based on PCC technology.

<PCC+Self-Driving+XR>

The self-driving vehicle may be implemented by a mobile robot, a vehicle, an unmanned aerial vehicle, etc. by applying PCC technology and XR technology. The self-driving vehicle to which the XR/PCC technology is applied may mean a self-driving vehicle equipped with a unit for providing an XR image or a self-driving vehicle which is subjected to control/interaction within the XR image. In particular, the self-driving vehicle which is subjected to control/interaction within the XR image is distinguished from the XR device and may be interwork with each other.

The self-driving vehicle equipped with a unit for providing an XR/PCC image may acquire sensor information from sensors including a camera, and output an XR/PCC image generated based on the acquired sensor information. For example, the self-driving vehicle has a HUD and may provide a passenger with an XR/PCC object corresponding to a real object or an object in a screen by outputting an XR/PCC image.

In this case, when the XR/PCC object is output to the HUD, at least a portion of the XR/PCC object may be output so as to overlap an actual object to which a passenger's gaze is directed. On the other hand, when the XR/PCC object is output to a display provided inside the self-driving vehicle, at least a portion of the XR/PCC object may be output to overlap the object in the screen. For example, the self-driving vehicle may output XR/PCC objects corresponding to objects such as a lane, other vehicles, traffic lights, traffic signs, two-wheeled vehicles, pedestrians, and buildings.

The VR technology, AR technology, MR technology, and/or PCC technology according to the embodiments are applicable to various devices. That is, VR technology is display technology that provides objects or backgrounds in the real world only as CG images. On the other hand, AR technology refers to technology that shows a virtual CG image on top of an actual object image. Furthermore, MR technology is similar to AR technology described above in that a mixture and combination of virtual objects in the real world is shown. However, in AR technology, the distinction between real objects and virtual objects made of CG images is clear, and virtual objects are used in a form that complements the real objects, whereas, in MR technology, virtual objects are regarded as equivalent to real objects unlike the AR technology. More specifically, for example, applying the MR technology described above is a hologram service. VR, AR and MR technologies may be integrated and referred to as XR technology.

Space Partition

Point cloud data (i.e., G-PCC data) may represent volumetric encoding of a point cloud consisting of a sequence of frames (point cloud frames). Each point cloud frame may include the number of points, the positions of the points, and the attributes of the points. The number of points, the positions of the points, and the attributes of the points may vary from frame to frame. Each point cloud frame may mean a set of three-dimensional points specified by zero or more attributes and Cartesian coordinates (x, y, z) of three-dimensional points in a particular time instance. Here, the Cartesian coordinates (x, y, z) of the three-dimensional points may be a position or a geometry.

In some embodiments, the present disclosure may further perform a space partition process of partitioning the point cloud data into one or more 3D blocks before encoding the point cloud data. The 3D block may mean whole or part of a 3D space occupied by the point cloud data. The 3D block may be one or more of a tile group, a tile, a slice, a coding unit (CU), a prediction unit (PU), or a transform unit (TU).

A tile corresponding to a 3D block may mean whole or part of the 3D space occupied by the point cloud data. Also, a slice corresponding to a 3D block may mean whole or part of a 3D space occupied by the point cloud data. A tile may be partitioned into one or more slices based on the number of points included in one tile. A tile may be a group of slices with bounding box information. The bounding box information of each tile may be specified in a tile inventory (or a tile parameter set, a tile parameter set (TPS)). A tile may overlap another tile in the bounding box. A slice may be a unit of data on which encoding is independently performed, or a unit of data on which decoding is independently performed. That is, a slice may be a set of points that may be independently encoded or decoded. In some embodiments, a slice may be a series of syntax elements representing part or whole of a coded point cloud frame. Each slice may include an index for identifying a tile to which the slice belongs.

The spatially partitioned 3D blocks may be processed independently or non-independently. For example, spatially partitioned 3D blocks may be encoded or decoded independently or non-independently, respectively, and may be transmitted or received independently or non-independently, respectively. In addition, the spatially partitioned 3D blocks may be quantized or dequantized independently or non-independently, and may be transformed or inversely transformed independently or non-independently, respectively. In addition, spatially partitioned 3D blocks may be rendered independently or non-independently. For example, encoding or decoding may be performed in units of slices or units of tiles. In addition, quantization or dequantization may be performed differently for each tile or slice, and may be performed differently for each transformed or inversely transformed tile or slice.

In this way, when the point cloud data is spatially partitioned into one or more 3D blocks and the spatially partitioned 3D blocks are processed independently or non-independently, the process of processing the 3D blocks is performed in real time and the process is performed with low latency. In addition, random access and parallel encoding or parallel decoding in a three-dimensional space occupied by point cloud data may be enabled, and errors accumulated in the encoding or decoding process may be prevented.

When the point cloud data is partitioned into one or more 3D blocks, information for decoding some point cloud data corresponding to a specific tile or a specific slice among the point cloud data may be required. In addition, in order to support spatial access (or partial access) to point cloud data, information related to 3D spatial areas may be required. Here, the spatial access may mean extracting, from a file, only necessary partial point cloud data in the entire point cloud data. The signaling information may include information for decoding some point cloud data, information related to 3D spatial areas for supporting spatial access, and the like. For example, the signaling information may include 3D bounding box information, 3D spatial area information, tile information, and/or tile inventory information.

The signaling information may be stored and signaled in a sample in a track, a sample entry, a sample group, a track group, or a separate metadata track. In some embodiments, the signaling information may be signaled in units of sequence parameter sets (SPSs) for signaling of a sequence level, geometry parameter sets (GPSs) for signaling of geometry coding information, and attribute parameter sets (APSs) for signaling of attribute coding information, tile parameter sets (TPSs) (or tile inventory) for signaling of a tile level, etc. In addition, the signaling information may be signaled in units of coding units such as slices or tiles.

Sample Group

The encapsulation processing unit mentioned in the present disclosure may generate a sample group by grouping one or more samples. The encapsulation processing unit, the metadata processing unit, or the signaling processing unit mentioned in the present disclosure may signal signaling information associated with a sample group in a sample, a sample group, or a sample entry. That is, the sample group information associated with the sample group may be added to a sample, a sample group, or a sample entry. The sample group information may be 3D bounding box sample group information, 3D region sample group information, 3D tile sample group information, 3D tile inventory sample group information, and the like.

Track Group

The encapsulation processing unit mentioned in the present disclosure may generate a track group by grouping one or more tracks. The encapsulation processing unit, the metadata processing unit, or the signaling processing unit mentioned in the present disclosure may signal signaling information associated with a track group in a sample, a track group, or a sample entry. That is, the track group information associated with the track group may be added to a sample, track group or sample entry. The track group information may be 3D bounding box track group information, point cloud composition track group information, spatial region track group information, 3D tile track group information, 3D tile inventory track group information, and the like.

Sample Entry

Figure 12:
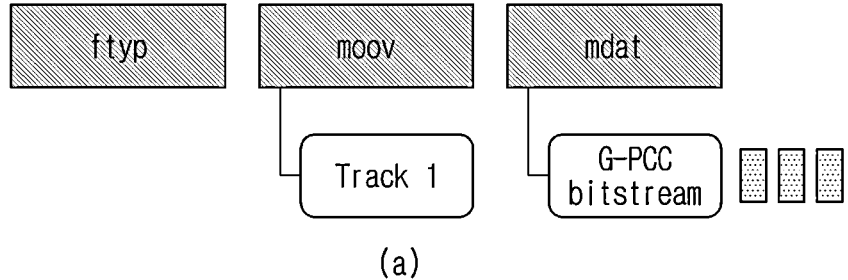
FIG. 12 illustrates an example of a file including a single track according to an embodiment of the present disclosure.
Figure 13:
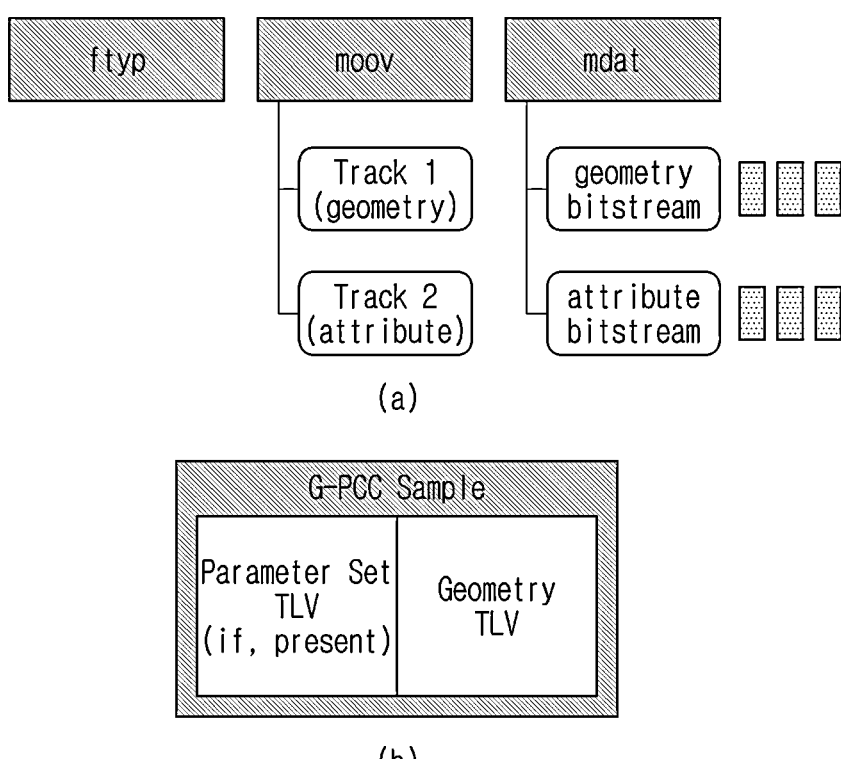
FIG. 13 illustrates an example of a file including multiple tracks according to an embodiment of the present disclosure.

FIG. 12 is a diagram for explaining an ISOBMFF-based file including a single track. (a) of FIG. 12 illustrates an example of the layout of an ISOBMFF-based file including a single track, and (b) of FIG. 12 illustrates an example of a sample structure of a mdat box when a G-PCC bitstream is stored in a single track of a file. FIG. 13 is a diagram for explaining an ISOBMFF-based file including multiple tracks. (a) of FIG. 13 illustrates an example of the layout of an ISOBMFF-based file including multiple tracks, and (b) of FIG. 13 illustrates an example of a sample structure of a mdat box when a G-PCC bitstream is stored in a single track of a file.

The stsd box (SampleDescriptionBox) included in the moov box of the file may include a sample entry for a single track storing the G-PCC bitstream. The SPS, GPS, APS, tile inventory may be included in a sample entry in a moov box or a sample in an mdat box in a file. Also, geometry slices and zero or more attribute slices may be included in the sample of the mdat box in the file. When a G-PCC bitstream is stored in a single track of a file, each sample may contain multiple G-PCC components. That is, each sample may be composed of one or more TLV encapsulation structures. A sample entry of a single track may be defined as follows.

Sample Entry Type: 'gpe1', 'gpeg'
Container: SampleDescriptionBox
Mandatory: A 'gpe1' or 'gpeg' sample entry is mandatory
Quantity: One or more sample entries may be present The sample entry type 'gpe1' or 'gpeg' is mandatory, and one or more sample entries may be present. The G-PCC track may use a Volumetric VisualSampleEntry having a sample entry type of 'gpe1' or 'gpeg'. The sample entry of the G-PCC track may include a G-PCC decoder configuration box GPCCConfigurationBox, and the G-PCC decoder configuration box may include a G-PCC decoder configuration record (GPCCDecoderConfigurationRecord( )). GPCCDecoderConfigurationRecord( ) may include at least one of configuration Version, profile_idc, profile_compatibility_flags, level_idc, numOfSetupUnitArrays, SetupUnitType, completeness, numOfSepupUnit, or setupUnit. The setupUnit array field included in GPCCDecoderConfigurationRecord( ) may include TLV encapsulation structures including one SPS.

If the sample entry type is 'gpe1', all parameter sets, e.g., SPS, GPS, APS, tile inventory, may be included in the array of setupUints. If the sample entry type is 'gpeg', the above parameter sets may be included in the array (i.e., sample entry) of setupUints or included in the stream (i.e., sample). An example of the syntax of a G-PCC sample entry (GPCCSampleEntry) having a sample entry type of 'gpe1' is as follows.

```
aligned(8) class GPCCSampleEntry( )
extends VolumetricVisualSampleEntry ('gpe1') {
  GPCCConfigurationBox config; //mandatory
  3DboundingBoxInfoBox( );
  CubicRegionInfoBox( );
  TileInventoryBox( );
}
```

A G-PCC sample entry (GPCCSampleEntry) having a sample entry type of 'gpe1' may include GPCCConfigurationBox, 3DBoundingBoxInfoBox( ), CubicRegionInfoBox( ), and TileInventoryBox( ). 3DBoundingBoxInfoBox( ) may indicate 3D bounding box information of point cloud data related to samples carried by the track. CubicRegionInfoBox( ) may indicate information on one or more spatial regions of point cloud data carried by samples in the track. TileInventoryBox( ) may indicate 3D tile inventory information of point cloud data carried by samples in the track.

As illustrated in (b) of FIG. 12, the sample may include TLV encapsulation structures including a geometry slice. In addition, a sample may include TLV encapsulation structures including one or more parameter sets. In addition, a sample may include TLV encapsulation structures including one or more attribute slices.

As illustrated in (a) of FIG. 13, when a G-PCC bitstream is carried by multiple tracks of an ISOBMFF-based file, each geometry slice or attribute slice may be mapped to an individual track. For example, a geometry slice may be mapped to track 1, and an attribute slice may be mapped to track 2. The track (track 1) carrying the geometry slice may be referred to as a geometry track or a G-PCC geometry track, and the track (track 2) carrying the attribute slice may be referred to as an attribute track or a G-PCC attribute track. In addition, the geometry track may be defined as a volumetric visual track carrying a geometry slice, and the attribute track may be defined as a volumetric visual track carrying an attribute slice.

A track carrying part of a G-PCC bitstream including both a geometry slice and an attribute slice may be referred to as a multiplexed track. In the case where the geometry slice and attribute slice are stored on separate tracks, each sample in the track may include at least one TLV encapsulation structure carrying data of a single G-PCC component. In this case, each sample contains neither geometry nor attributes, and may not contain multiple attributes. Multi-track encapsulation of a G-PCC bitstream may enable a G-PCC player to effectively access one of the G-PCC components. When a G-PCC bitstream is carried by multiple tracks, in order for a G-PCC player to effectively access one of the G-PCC components, the following conditions need to be satisfied.

a) When a G-PCC bitstream consisting of TLV encapsulation structures is carried by multiple tracks, the track carrying the geometry bitstream (or geometry slice) becomes the entry point.

b) In the sample entry, a new box is added to indicate the role of the stream included in the track. The new box may be the aforementioned G-PCC component type box (GPCCComponentTypeBox). That is, GPCCComponentTypeBox may be included in the sample entry for multiple tracks.

c) Track reference is introduced from a track carrying only a G-PCC geometry bitstream to a track carrying a G-PCC attribute bitstream.

GPCCComponentTypeBox may include GPCCComponentTypeStruct( ). If a GPCCComponentTypeBox is present in the sample entry of tracks carrying part or whole of the G-PCC bitstream, then GPCCComponentTypeStruct( ) may specify the type (e.g., geometry, attribute) of one or more G-PCC components carried by each track. For example, if the value of the gpcc_type field included in GPCCComponentTypeStruct( ) is 2, it may indicate a geometry component, and if it is 4, it may indicate an attribute component. In addition, when the value of the gpcc_type field indicates 4, that is, an attribute component, an AttrIdx field indicating an attribute identifier signaled to SPS( ) may be further included.

In the case where the G-PCC bitstream is carried by multiple tracks, the syntax of the sample entry may be defined as follows.

Sample Entry Type: 'gpe1', 'gpeg', 'gpc1' or 'gpcg'
Container: SampleDescriptionBox
Mandatory: 'gpc1', 'gpcg' sample entry is mandatory
Quantity: One or more sample entries may be present The sample entry type 'gpc1', 'gpcg', 'gpc1' or 'gpcg' is mandatory, and one or more sample entries may be present. Multiple tracks (e.g., geometry or attribute tracks) may use a Volumetric VisualSampleEntry having a sample entry type of 'gpc1', 'gpcg', 'gpc1' or 'gpcg'. In the 'gpe1' sample entry, all parameter sets may be present in the setupUnit array. In the 'gpeg' sample entry, the parameter set is present in the array or stream. In the 'gpe1' or 'gpeg' sample entry, the GPCCComponentTypeBox shall not be present. In the 'gpc1' sample entry, the SPS, GPS and tile inventory may be present in the SetupUnit array of the track carrying the G-PCC geometry bitstream. All relevant APSs may be present in the SetupUnit array of the track carrying the G-PCC attribute bitstream. In the 'gpcg' sample entry, an SPS, GPS, APS or tile inventory may be present in the array or stream. In the 'gpc1' or 'gpcg' sample array, the GPCCComponentTypeBox shall be present.

An example of the syntax of the G-PCC sample entry is as follows.

```
aligned(8) class GPCCSampleEntry( )
extends VolumetricVisualSampleEntry (codingname) {
GPCCConfigurationBox      config;      //mandatory
GPCCComponentTypeBox      type;        // optional
}
```

The compressorname, that is, codingname, of the base class Volumetric VisualSampleEntry may indicate the name of a compressor used together with the recommended "013GPCC coding" value. In "\013GPCC coding", the first byte (octal number 13 or decimal number 11 represented by \013) is the number of remaining bytes, and may indicate the number of bytes of the remaining string. congif may include G-PCC decoder configuration information. info may indicate G-PCC component information carried in each track. info may indicate the component tile carried in the track, and may also indicate the attribute name, index, and attribute type of the G-PCC component carried in the G-PCC attribute track.

Sample Format

When the G-PCC bitstream is stored in a single track, the syntax for the sample format is as follows.

```
aligned(8) class GPCCSample
{
unsigned int GPCCLength = sample_size; //Size of Sample
for (i=0; i< GPCCLength; ) // to end of the sample
{
tlv_encapsulation gpcc_unit;
i += (1+4)+ gpcc_unit.tlv_num_payload_bytes;
}
}
```

In the above syntax, each sample (GPCCSample) corresponds to a single point cloud frame, and may be composed of one or more TLV encapsulation structures belonging to the same presentation time. Each TLV encapsulation structure may include a single type of TLV payload. In addition, one sample may be independent (e.g., a sync sample). GPCCLength indicates the length of the sample, and gpcc_unit may include an instance of a TLV encapsulation structure including a single G-PCC component (e.g., a geometry slice).

When the G-PCC bitstream is stored in multiple tracks, each sample may correspond to a single point cloud frame, and samples contributing to the same point cloud frame in different tracks may have to have the same presentation time. Each sample may consist of one or more G-PCC units of the G-PCC component indicated in the GPCCComponentInfoBox of the sample entry and zero or more G-PCC units carrying one of a parameter set or a tile inventory. When a G-PCC unit including a parameter set or a tile inventory is present in a sample, the F-PCC sample may need to appear before the G-PCC unit of the G-PCC component. Each sample may contain one or more G-PCC units containing an attribute data unit, and zero or more G-PCC units carrying a parameter set. In the case where the G-PCC bitstream is stored in multiple tracks, the syntax and semantics for the sample format may be the same as the syntax and semantics for the case where the G-PCC bitstream is stored in a single track described above.

Subsample

In the receiving device, since the geometry slice is first decoded and the attribute slice needs to be decoded based on the decoded geometry, when each sample consists of multiple TLV encapsulation structures, it is necessary to access each TLV encapsulation structure in the sample. In addition, if one sample is composed of multiple TLV encapsulation structures, each of the multiple TLV encapsulation structures may be stored as a sub-sample. A subsample may be referred to as a G-PCC subsample. For example, if one sample includes a parameter set TLV encapsulation structure including a parameter set, a geometry TLV encapsulation structure including a geometry slice, and an attribute TLV encapsulation structure including an attribute slice, the parameter set TLV encapsulation structure, the geometry TLV encapsulation structure, and the attribute TLV encapsulation structure may be stored as subsamples, respectively. In this case, in order to enable access to each G-PCC component in the sample, the type of the TLV encapsulation structure carried by the subsample may be required.

When the G-PCC bitstream is stored in a single track, the G-PCC subsample may include only one TLV encapsulation structure. One SubSampleInformationBox may be present in a sample table box (SampleTableBox, stbl) of a moov box, or may be present in a track fragment box (TrackFragment-Box, traf) of each of the movie fragment boxes (MovieFrag-mentBox, moof). If the SubSampleInformationBox is present, the 8-bit type value of the TLV encapsulation structure may be included in the 32-bit codec_specific_parameters field of the sub-sample entry in the SubSampleInformation-Box. If the TLV encapsulation structure includes the attri-bute payload, the 6-bit value of the attribute index may be included in the 32-bit codec_specific_parameters field of the subsample entry in the SubSampleInformationBox. In some embodiments, the type of each subsample may be identified by parsing the codec_specific_parameters field of the sub-sample entry in the SubSampleInformationBox. Codec_specific_parameters of SubSampleInformationBox may be defined as follows.

```
if (flags == 0) {
unsigned int(8) PayloadType;
if(PayloadType == 4) { // attribute payload
unsigned int(6) AttrIdx;
bit(18) reserved = 0;
}
else
bit(24) reserved = 0;
} else if (flags == 1) {
unsigned int(1)              tile_data;
bit(7)                       reserved = 0;
if (tile_data)
unsigned int(24)             tile_id;
else
bit(24)                      reserved = 0;
}
```

In the above subsample syntax, payloadType may indicate the tlv_type of the TLV encapsulation structure in the subsample. For example, if the value of payloadType is 4, the attribute slice (i.e., attribute slice) may be indicated. attrIdx may indicate an identifier of attribute information of a TLV encapsulation structure including an attribute payload in the subsample. attrIdx may be the same as ash_attr_sp-s_attr_idx of the TLV encapsulation structure including the attribute payload in the subsample. tile_data may indicate whether a subsample includes one tile or another tile. When the value of tile_data is 1, it may indicate that the subsample includes TLV encapsulation structure(s) including a geom-etry data unit or an attribute data unit corresponding to one G-PCC tile. When the value of tile_data is 0, it may indicate that the subsample includes TLV encapsulation structure(s) including each parameter set, tile inventory, or frame bound-ary marker. tile_id may indicate an index of a G-PCC tile with which a subsample is associated in a tile inventory.

When the G-PCC bitstream is stored in multiple tracks (in case of multiple-track encapsulation of G-PCC data in ISOBMFF), if subsamples are present, only SubSampleIn-formationBox whose flag is 1 in SampleTableBox or TrackFragmentBox of each MovieFragmentBox may need to be present. In the case where the G-PCC bitstream is stored in multiple tracks, the syntax elements and semantics may be the same as the case where flag==1 in the syntax elements and semantics when the G-PCC bitstream is stored in a single track.

Reference Between Tracks

When the G-PCC bitstream is carried in multiple tracks (that is, when the G-PCC geometry bitstream and the attribute bitstream are carried in different (separate) tracks), in order to connect between the tracks, a track reference tool may be used. One TrackReferenceTypeBoxes may be added to a TrackReferenceBox in the TrackBox of a G-PCC track. The TrackReferenceTypeBox may contain an array of track_IDs specifying the tracks referenced by the G-PCC track.

In some embodiments, the present disclosure may provide a device and method for supporting temporal scalability in the carriage of G-PCC data (hereinafter, may be referred to as a G-PCC bitstream, an encapsulated G-PCC bitstream, or a G-PCC file). In addition, the present disclosure may propose a device and methods for providing a point cloud content service, which efficiently stores a G-PCC bitstream in a single track in a file, or divisionally stores it in a plurality of tracks, and provides a signaling therefor. In addition, the present disclosure proposes a device and meth-ods for processing a file storage technique to support effi-cient access to a stored G-PCC bitstream.

Temporal Scalability

Temporal scalability may refer to a function that allows the possibility of extracting one or more subsets of inde-pendently coded frames. Also, temporal scalability may refer to a function of dividing G-PCC data into a plurality of different temporal levels and independently processing each G-PCC frame belonging to different temporal levels. If temporal scalability is supported, the G-PCC player (or the transmission device and/or the reception device of the present disclosure) may effectively access a desired compo-nent (target component) among G-PCC components. In addition, if temporal scalability is supported, since G-PCC frames are processed independently of each other, temporal scalability support at the system level may be expressed as more flexible temporal sub-layering. In addition, if temporal scalability is supported, the system (the point cloud content provision system) that processes G-PCC data can manipu-late data at a high level to match network capability or decoder capability, the performance of the point cloud content provision system can be improved.

Embodiment

If temporal scalability is supported, G-PCC content may be carried in a plurality of tile tracks, and information on temporal scalability may be signaled.

As an example, the temporal scalability information may be carried using a box present in a track or a tile base track and a box present in a tile track, that is, a box for temporal scalability information (hereinafter referred to as 'temporal scalability information box' or 'scalability information box'). A box present in a GPCC track or a tile base track carrying temporal scalability information may be a GPCCScalabilityInfoBox, and a box present in a tile track may be a GPCCTileScalabilityInfoBox. The GPCCTileS-calabilityInfoBox may be present in each tile track associ-ated with the tile base track in which the GPCCScalabili-tyInfoBox is present.

A tile base track may be a track with a sample entry type of 'gpeb' or 'gpcb'. On the other hand, when GPCCScal-abilityInfoBox is present in a track with a sample entry type of 'gpe1', 'gpeg', 'gpc1', 'gpcg', 'gpcb', or 'gpeb', it may indicate that temporal scalability is supported, and informa-tion on the temporal level present in the track may be provided. Such a box may not be present in the track if temporal scalability is not used. Also, if all frames are signaled at a single temporal level, it may not be present in a track with a sample entry type of 'gpe1', 'gpeg', 'gpc1', 'gpcg', 'gpcb', or 'gpeb'. On the other hand, such a box may not be present in a track with a sample entry type of 'gpt1'. A GPCC track including a box for temporal scalability information (i.e., a temporal scalability information box) in a sample entry may be expressed as a temporal level track.

On the other hand, when information on temporal scalability is included in a temporal scalability information box (e.g., GPCCScalabilityInfoBox), in the case of tracks with sample entries of 'gpc1' and 'gpcg' types in which this box is present, one type of component (e.g., geometry or attribute) of G-PCC data may be included in each track. In this case, since some or all of the syntax element values of the temporal scalability information may need to be the same in all tracks where temporal scalability is used, in this case, the same scalability information may be signaled redundantly, which may be inefficient.

In order to solve the above problem, the present disclosure proposes technology for specifying a track in which temporal scalability information, that is, a temporal scalability information box, is present, and processing the temporal scalability information when the box is not present.

Hereinafter, the technology proposed by the present disclosure will be described in detail using embodiments.

Embodiment 1

Temporal scalability information according to an embodiment of the present disclosure will be described with reference to Table 1.

specific sample entry type may be 'gpc1' or 'gpcg', and the specific component may be a geometry component. As an example, the temporal scalability information may be carried by a specific temporal scalability information box (e.g., GPCCScalabilityInfoBox), and, when one track carries another component, the temporal scalability information box may not be present in the track. Here, an attribute component may be included in the other component, as an example. Here, one track may have a specific sample entry type, and the specific sample entry type may be as described above. In this case, temporal scalability information in a track carrying the other component (e.g., attribute component) may be inferred from temporal scalability information of another track. For example, a temporal scalability information box in a track carrying a first component (e.g., an attribute component) may be derived from temporal scalability information in a track carrying a second component (e.g., a geometry component). In this case, the sample entry types (e.g., 'gpc1' and 'gpcg') of the two tracks may be the same. As an example, a track carrying a second component (e.g., geometry component) from which temporal scalability information of a track carrying a first component (e.g., an attribute component) is derived corresponds to a corresponding sample entry type with the same sample entry type. Also, referring to FIG. 14, in a track with a specific sample entry type, a temporal extensibility information box may be present after a component information box (e.g., GPCCComponentInfoBox).

According to the embodiment of the present disclosure, by specifying a track in which a temporal scalability infor-

TABLE 1

```
...
aligned(8) class GPCCSampleEntry( )
extends VolumetricVisualSampleEntry (type) {
//type is 'gpcl' or 'gpcg'
    GPCCConfigurationBox            config;
    GPCCComponentInfoBox            info;
    GPCCScalabilityInfoBox          temporalLevelInfo;
    // optional boxes
}
```

G-PCC scalability information box
Definition

| Box Types: | 'gsci' |
|---|---|
| Container: | GPCCSampleEntry ('gpe1', 'gpeg', 'gpc1', 'gpcg', 'gpcb', 'gpeb') |
| Mandatory: | No |
| Quantity: | Zero or one |

This box signals scalability information for a G-PCC track. When this box is present in tracks with sample entries of type 'gpe1', 'gpeg', 'gpc1', 'gpcg', 'gpcb', and 'gpeb', it indicates that temporal scalability is supported and provides information about the temporal levels present in that G-PCC track. This box shall not be present in a track when temporal scalability is not used. This box shall not be present in tracks with sample entries of type 'gpe1', 'gpeg', 'gpc1', 'gpcg', 'gpcb', and 'gpeb', when all the frames are signalled in one temporal level. This box shall not be present in tracks with a sample entry of type 'gpt1'. A G-PCC track containing GPCCScalabilityInfoBox box in the sample entry is referred as temporal level track. For track with sample entry type 'gpc1' or 'gpcg', GPCCScalabilityInfoBox may be present only if the track carries geometry component. For track with sample entry type 'gpc1' or 'gpcg' that carries attribute component, GPCCScalabilityInfoBox is not present but it is inferred from the GPCCScalabilityInfoBox in the sample entry of the corresponding track that carries the geometry component.

As an example, if temporal scalability is used and G-PCC data is stored/carried in a track, and the track has a specific sample entry type, the scalability information, i.e., temporal scalability information, may be present only in a track carrying only a specific component. As an example, a mation box may be present as a track carrying a specific component (e.g., geometry component), signaling overhead of the temporal scalability information box of the track carrying the attribute component can be reduced and image encoding/decoding efficiency can be improved.

Embodiment 2

Temporal scalability information according to an embodiment of the present disclosure will be described with reference to Table 2.

TABLE 2

```
. . .
G-PCC scalability information box
Definition
Box Types:    'gsci'
Container:    GPCCSampleEntry ('gpe1', 'gpeg', 'gpc1', 'gpcg', 'gpcb', and 'gpeb')
Mandatory:    No
Quantity:     Zero or one
This box signals scalability information for a G-PCC track. When this box is present in tracks with
sample entries of type 'gpe1', 'gpeg', 'gpc1', 'gpcg', 'gpcb', and 'gpeb', it indicates that
temporal scalability is supported and provides information about the temporal levels present in that G-PCC
track. This box shall not be present in a track when temporal scalability is not used. This box shall not be
present in tracks with sample entries of type 'gpe1', 'gpeg', 'gpc1', 'gpcg', 'gpcb',
and 'gpeb', when all the frames are signalled in one temporal level.
This box shall not be present in tracks with a sample entry of type 'gpt1'. A G-PCC track containing
GPCCScalabilityInfoBox box in the sample entry is referred as temporal level track.
When this box is present in tracks with sample entries of type 'gpc1' or 'gpcg' that contains attribute
component, it is constrained that the values of syntax elements in the box shall be the same as their
corresponding syntax elements in the GPCCScalabilityInfoBox of the associated track that contains
geometry component.
. . .
```

If temporal scalability is used and G-PCC data is stored/carried in a track, and a track has a specific sample entry type (e.g., 'gpc1', 'gpcg'), values of all syntax elements included in temporal scalability information of a track carrying a specific component (e.g., attribute component) may be the same as corresponding syntax elements included in temporal scalability information of a track carrying another component (e.g., a geometry component). For example, some or all of the temporal scalability information included in the temporal scalability information boxes of the two tracks may be the same. In this case, the temporal scalability information of a track carrying a specific component is not separately signaled, or the track (e.g., the track carrying the attribute component) refers to another track (e.g., the track carrying the geometry component). That is, only information indicating that it is identical to the temporal scalability information of the other track may be signaled.

According to the embodiment of the present disclosure, signaling overhead of the temporal scalability information of the track carrying the attribute component can be reduced, contradiction between temporal scalability information can be prevented by equalizing the temporal scalability information of the track carrying the attribute component with the temporal scalability information of the track carrying the other component, and image encoding/decoding efficiency can be improved.

Encoding and Decoding Process

Figure 14:
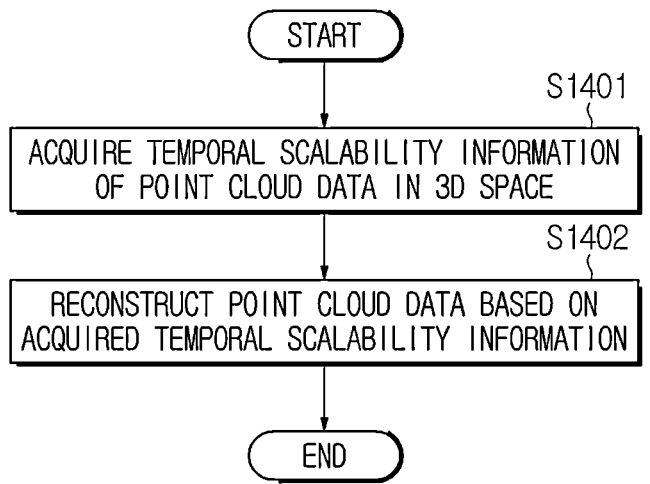
FIGS. 14 to 15 illustrate an example of a method performed by a point cloud reception device or a point cloud transmission device according to an embodiment of the present disclosure.
Figure 15:
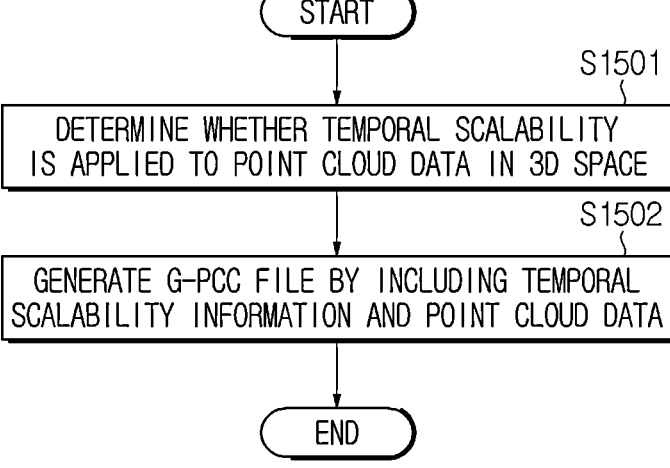

FIG. 14 illustrates an example of a method performed by a reception device of point cloud data, and FIG. 15 illustrates an example of a method performed by a transmission device of point cloud data. As an example, the reception device or the transmission device may include those described with reference to the drawings in the present disclosure, and may be the same as the reception device or the transmission device assumed to describe the embodiment above. That is, it is obvious that the reception device performing FIG. 14 and the transmission device performing FIG. 15 may also implement the other embodiments described above.

As an example, referring to FIG. 14, the reception device may acquire temporal scalability information of a point cloud in a three-dimensional space based on a G-PCC file (S1401). The G-PCC file may be acquired by being transmitted from the transmission device. Thereafter, the reception device may reconstruct a 3D point cloud based on the temporal scalability information (S1402), and the temporal scalability information may be acquired from one or more tracks, and one or more tracks may include a first track, . . . , and an n-th track. As an example, the temporal scalability information of the first track may be derived from the temporal scalability information of the second track based on a component carried by the first track. That is, the temporal scalability information may be derived from the temporal scalability information of another track based on the component carried by the track. As an example, if the first track is a track carrying a first component (e.g., an attribute component), the temporal scalability information of the first track may be derived from the temporal scalability information of the second track. As an example, the sample entry type of the first track may be any one of a specific type (e.g., 'gpc1' or 'gpcg'). Also, the second track may be a track carrying a second component (e.g., a geometry component). That is, the temporal scalability information of one track may be derived (or inferred) from the temporal scalability information of the track carrying other component in addition to the components carried by one track. Also, the sample entry type of the second track may be, for example, 'gpc1' or 'gpcg'. Meanwhile, the temporal scalability information may be acquired only from a track carrying a specific component (e.g., geometry component). That is, temporal scalability information may be acquired based on the component carried by the track. As an example, temporal scalability information may not be present or may not be acquired in a track carrying a component other than the specific component. As another example, the temporal scalability information may be acquired from all tracks whose sample entry type is not a specific type (e.g., 'gpt1'). That is, the temporal scalability information may be acquired based on the sample entry type of the track. In other words, the temporal scalability information may be acquired or derived based on the sample entry type and/or the component carried by the track. Meanwhile, the temporal scalability information may be acquired by being included in a scalability information box (e.g., GPCCScalabilityInfoBox). In addition, it may be signaled prior to a component information box (e.g., GPCCComponentInfoBox).

As another example, referring to FIG. 15, the transmission device may determine whether temporal scalability is applied to point cloud data in a three-dimensional space (S1501), and may generate a G-PCC file by including temporal scalability information and point cloud data (S1502). Here, the temporal scalability information is carried by one or more tracks, and, as described above, one or more tracks include a first track, . . . , and an n-th track. Whether or not temporal scalability information may be present in the first track, that is, presence/absence, may be determined based on a component carried by the first track. That is, whether or not temporal scalability information of a track is present may be determined based on a component carried by the track. If one track, that is, the first track, carries a specific component (e.g., an attribute component), the temporal scalability information of the first track may be skipped. That is, it may not be signaled. Here, the sample entry type of the track may be a specific type (e.g., 'gpc1' or 'gpcg'). That is, whether temporal scalability information of a track is present may be determined based on the sample entry type of the track. That is, whether or not the temporal scalability information of the track is present may be determined based on at least one of the sample entry type of the track and/or the component carried by the track. As an example, when the transmission device determines that temporal scalability information of a track is not present, the reception device may derive (infer) it based on other temporal scalability information, as described above. As an example, if one track carries a specific component (e.g., geometry component), temporal scalability information of one track may be included in a G-PCC file. That is, it may be explicitly signaled.

According to an embodiment of the present disclosure, it is possible to improve image encoding/decoding efficiency, by clarifying signaling of temporal scalability information.

The scope of the present disclosure includes software or machine-executable instructions (e.g., operating system, application, firmware, program, etc.) that cause operation according to the method of various embodiments to be executed on a device or computer, and anon-transitory computer-readable medium in which such software, instructions and the like are stored and executable on a device or computer.

INDUSTRIAL APPLICABILITY

Embodiments according to the present disclosure may be used to provide point cloud content. Also, embodiments according to the present disclosure may be used to encode/decode point cloud data.

The invention claimed is:

1. A method performed by a reception device of point cloud data, the method comprising:

obtaining temporal scalability information of a point cloud in a three-dimensional space based on a G-PCC file; and reconstructing the three-dimensional point cloud based on the temporal scalability information, wherein the temporal scalability information is obtained from one or more tracks, and temporal scalability information of a first track is derived from temporal scalability information of a second track based on a component carried by the first track, wherein the temporal scalability information of the first track is derived from the temporal scalability information of the second track, based on the first track carrying an attribute component, and wherein a sample entry type of the first track is any one of 'gpc1' or 'gpcg'.

2. The method of claim 1, wherein the second track is a track carrying a geometry component.

3. The method of claim 2, wherein a sample entry type of the second track is any one of 'gpc1' or 'gpcg'.

4. The method of claim 1, wherein the temporal scalability information is obtained from only a track carrying a geometry component.

5. The method of claim 1, wherein the temporal scalability information is obtained by a scalability information box (GPCCScalabilityInfoBox).

6. The method of claim 1, wherein the temporal scalability information is obtained from a track whose sample entry type excepts 'gpt1'.

7. A method performed by a transmission device of point cloud data, the method comprising:

determining whether temporal scalability is applied to point cloud data in a three-dimensional space; and generating a G-PCC file by including temporal scalability information and the point cloud data, wherein the temporal scalability information is carried by one or more tracks, and a presence of temporal scalability information in a first track is determined based on a component carried by the first track, wherein temporal scalability information of the first track is skipped based on the first track carrying an attribute component, and wherein a sample entry type of the first track is any one of 'gpc1' or 'gpcg'.

8. The method of claim 7, wherein the temporal scalability information of the first track is included in the G-PCC file based on the first track carrying a geometry component.

9. A reception device of point cloud data, the reception device comprising:

a memory; and at least one processor, wherein the at least one processor is configured to:

obtain temporal scalability information of a point cloud in a three-dimensional space based on a G-PCC file; and reconstruct the three-dimensional point cloud based on the temporal scalability information, wherein the temporal scalability information is obtained from one or more tracks, and temporal scalability information of a first track is derived from temporal scalability information of a second track based on a component carried by the first track, wherein the temporal scalability information of the first track is derived from the temporal scalability information of the second track, based on the first track carrying an attribute component, and wherein a sample entry type of the first track is any one of 'gpc1' or 'gpcg'.

10. A transmission device of point cloud data, the transmission device comprising:

a memory; and at least one processor, wherein the at least one processor is configured to:

determine whether temporal scalability is applied to point cloud data in a three-dimensional space; and generate a G-PCC file by including temporal scalability information and the point cloud data, wherein the temporal scalability information is carried by one or more tracks, and a presence of temporal scalability information in a first track is determined based on a component carried by the first track, wherein temporal scalability information of the first track is skipped based on the first track carrying an attribute component, and wherein a sample entry type of the first track is any one of 'gpc1' or 'gpcg'.

* * * * *